United States Patent
Gupta et al.

(10) Patent No.: US 10,694,498 B2
(45) Date of Patent: Jun. 23, 2020

(54) TRAFFIC SCHEDULING IN A MULTI-HOP COMMUNICATIONS SYSTEM

(71) Applicant: QUALCOMM Incorporated, San Diego, CA (US)

(72) Inventors: Piyush Gupta, Bridgewater, NJ (US); Junyi Li, Chester, NJ (US); Saurabha Rangrao Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 15/192,556

(22) Filed: Jun. 24, 2016

(65) Prior Publication Data
US 2017/0150481 A1    May 25, 2017

Related U.S. Application Data

(60) Provisional application No. 62/258,925, filed on Nov. 23, 2015.

(51) Int. Cl.
*H04W 72/04* (2009.01)
*H04B 7/155* (2006.01)
(Continued)

(52) U.S. Cl.
CPC ........ *H04W 72/04* (2013.01); *H04B 7/15507* (2013.01); *H04L 1/1854* (2013.01);
(Continued)

(58) Field of Classification Search
CPC ..... H04W 88/02; H04W 88/04; H04W 56/00; H04W 56/01; H04W 72/042;
(Continued)

(56) References Cited

U.S. PATENT DOCUMENTS 7,103,371 B1   9/2006 Liu
8,270,337 B2   9/2012 Yu et al.
(Continued)

FOREIGN PATENT DOCUMENTS

EP         1919143 A2 *  5/2008  ........ H04W 72/0406
WO   WO-2015069051 A1   5/2015
(Continued)

OTHER PUBLICATIONS

ITL Inc.,"Considerations on Resource Allocation for UE-to-Network Relays," R1-154548, 3GPP TSG RAN WG1 Meeting #82, Aug. 24-28, 2015 (Year: 2015).*
(Continued)

*Primary Examiner* — Un C Cho
*Assistant Examiner* — Lalita W Pace
(74) *Attorney, Agent, or Firm* — Steven R. Thiel; Holland & Hart LLP

(57) ABSTRACT

Methods, systems, and devices for wireless communication are described. The methods, systems, and devices may include receiving control information from a serving station, synchronizing with an end device based at least in part on the control information received from the serving station, and receiving an acknowledgement (ACK) from the end device in response to the synchronizing, the ACK indicating the end device is synchronized with the relay device. The methods, systems, and devices may also include receiving a data packet from the end device subsequent to the synchronizing, and transmitting, to the serving station, the data packet received from the end device, the transmitting based at least in part on the control information received from the serving station.

16 Claims, 21 Drawing Sheets

(51) Int. Cl.
*H04W 56/00* (2009.01)
*H04L 1/18* (2006.01)
*H04W 28/02* (2009.01)
*H04W 88/02* (2009.01)

(52) U.S. Cl.
CPC .......... *H04W 28/02* (2013.01); *H04W 56/00* (2013.01); *H04W 88/02* (2013.01)

(58) Field of Classification Search
CPC .............. H04W 72/0446; H04W 72/04; H04L 1/1854; H04L 1/1864; H04B 7/15507
See application file for complete search history.

(56) References Cited

U.S. PATENT DOCUMENTS

| | | |
|---|---|---|
| 8,885,520 B2 | 11/2014 | Zhang et al. |
| 10,070,448 B2 | 9/2018 | Lee et al. |
| 2009/0110405 A1* | 4/2009 | Lee .................... H04B 10/1143 398/130 |
| 2012/0170481 A1* | 7/2012 | Kimura .............. H04B 7/15542 370/252 |
| 2012/0201216 A1* | 8/2012 | Wu ....................... H04L 1/0072 370/329 |
| 2013/0016630 A1 | 1/2013 | Bhushan et al. |
| 2015/0029866 A1* | 1/2015 | Liao ...................... H04W 4/023 370/241 |
| 2016/0044613 A1* | 2/2016 | Cai ....................... H04W 56/00 370/315 |
| 2016/0295565 A1 | 10/2016 | Kim et al. |
| 2016/0338095 A1* | 11/2016 | Faurie ............... H04W 28/0278 |
| 2016/0353397 A1 | 12/2016 | Jung et al. |
| 2017/0230941 A1* | 8/2017 | Agiwal ................ H04W 72/04 |
| 2018/0054804 A1* | 2/2018 | Luo ....................... H04W 72/04 |
| 2018/0139684 A1* | 5/2018 | Aminaka .............. H04W 88/04 |
| 2018/0146494 A1* | 5/2018 | Khoryaev ............ H04W 76/14 |
| 2018/0199312 A1* | 7/2018 | Wu ....................... H04W 72/02 |

FOREIGN PATENT DOCUMENTS

| | | |
|---|---|---|
| WO | WO-2015115823 A1 | 8/2015 |
| WO | WO 2015143170 A1 | 9/2015 |

OTHER PUBLICATIONS

ISA/EPO, Partial International Search Report of the International Searching Authority, Int'l Application No. PCT/US2016/059652, dated Feb. 13, 2017, European Patent Office, Rijswijk, NL, 9 pgs.

ITL Inc., "Considerations on Resource Allocation for UE-to-Network Relays," R1-154548, Beijing, China, Aug. 24-28, 2015, 4 pgs., XP_051001818, 3rd Generation Partnership Project.

ZTE, "Resource Allocation for Relay UE and Remote UE," 3GPP TSG-RAN WG2 Meeting #90, R2-152552, Fukuoka, Japan, May 25-29, 2015, 4 pgs., XP_050973522, 3rd Generation Partnership Project.

Huawei et al., "RAN2 Impact of ProSe Priorities," 3GPP TSG-RAN WG2 Meeting #90, R2-152760, Fukuoka, Japan, May 25-29, 2015, 5 pgs., XP050973490, 3rd Generation Partnership Project.

ISA/EP, International Search Report and Written Opinion of the International Searching Authority, Int'l Application No. PCT/US2016/059652, dated May 30, 2017, European Patent Office, Rijswijk, NL, 24 pgs.

ZTE, "Resource Scheme for UE-to-Network Relay UE and Remote UE," 3GPP TSG-RAN WG1 Meeting #82, R1-154050, Beijing, China, Aug. 24-28, 2015, 6 pgs., XP051001441, 3rd Generation Partnership Project.

* cited by examiner

TRAFFIC SCHEDULING IN A MULTI-HOP COMMUNICATIONS SYSTEM

CROSS REFERENCES

The present application for patent claims priority to U.S. Provisional Patent Application No. 62/258,925 by Gupta et al., entitled "Traffic Scheduling in a Multi-Hop Communications System," filed Nov. 23, 2015, assigned to the assignee hereof.

BACKGROUND

The following relates generally to wireless communication, and more specifically to traffic scheduling in a multi-hop communications system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some deployments, such as a multi-hop deployment, a relay UE may communicate with one or more additional UEs (end device UEs) and act as an intermediary device to allow data to be exchanged between a serving station and an end device UE. For example, if an end device UE resides outside the coverage area of a serving station, the end device UE may synchronize with a relay UE that is in communication with the serving station and data may then be exchanged between the end device UE and the serving station using the relay UE.

During uplink (UL) transmission, when multiple end device UEs are using the same relay UE to exchange data with a serving station, or when multiple relay UEs are communicating with the same serving station, data transmitted from some (or all) of the multiple end device UEs may collide during transmission. Similarly, data transmissions from multiple relay UEs may collide during transmission to the serving station. Further, during downlink (DL) transmission, data transmitted to multiple end device UEs and/or multiple relay UEs may collide during transmission. In such situations, the aforementioned collisions may cause transmission or reception interference and may result in a loss of data between one or more end device UEs, the relay UE, and the serving station.

SUMMARY

The present disclosure, for example, relates to techniques for scheduling traffic in wireless communications systems. Various aspects of the disclosure provide scheduling of uplink (UL) or downlink (DL) transmission between a serving station, a relay user equipment (UE), and an end device UE in a multi-hop communications system. In some examples, when an end device UE is in communication with a relay UE, the serving station may transmit control information to at least one of the relay UE and the end device UE. The control information may include assignment information for the relay UE, assignment information for the end device UE, and/or data slot partition information of the serving station. Using the control information, data may be exchanged between the end device UE and the serving station using the relay UE.

A method of wireless communication is described. The method may include receiving control information from a serving station, determining resource assignment information for an end device based at least in part on the control information received from the serving station, synchronizing with the end device based at least in part on the control information received from the serving station, receiving a data packet from the end device subsequent to the synchronizing, the receiving based at least in part on the determined resource assignment information, and transmitting, to the serving station, the data packet received from the end device, the transmitting based at least in part on the control information received from the serving station.

An apparatus for wireless communication is described. The apparatus may include means for receiving control information from a serving station, means for determining resource assignment information for an end device based at least in part on the control information received from the serving station, means for synchronizing with the end device based at least in part on the control information received from the serving station, means for receiving a data packet from the end device subsequent to the synchronizing, the receiving based at least in part on the determined resource assignment information, and means for transmitting, to the serving station, the data packet received from the end device, the transmitting based at least in part on the control information received from the serving station.

Another apparatus for wireless communication is described. The apparatus may include a processor, memory in electronic communication with the processor, and instructions stored in the memory. The instructions may be operable to cause the processor to receive control information from a serving station, determine resource assignment information for an end device based at least in part on the control information received from the serving station, synchronize with the end device based at least in part on the control information received from the serving station, receive a data packet from the end device subsequent to the synchronizing, the receiving based at least in part on the determined resource assignment information, and transmit, to the serving station, the data packet received from the end device, the transmitting based at least in part on the control information received from the serving station.

A non-transitory computer readable medium for wireless communication is described. The non-transitory computer-readable medium may include instructions operable to cause a processor to receive control information from a serving station, determine resource assignment information for an end device based at least in part on the control information received from the serving station, synchronize with the end device based at least in part on the control information received from the serving station, receive a data packet from the end device subsequent to the synchronizing, the receiving based at least in part on the determined resource assignment information, and transmit, to the serving station, the data packet received from the end device, the transmitting based at least in part on the control information received from the serving station.

In some examples of the method, apparatus, and non-transitory computer-readable medium described above, receiving control information comprises: receiving a Physical Downlink Control Channel (PDCCH) from the serving station.

In some examples of the method, apparatus, and non-transitory computer-readable medium described above, receiving control information comprises: receiving the resource assignment information for at least one of the relay device or the end device.

In some examples of the method, apparatus, and non-transitory computer-readable medium described above, receiving control information comprises: receiving data slot partition information of the serving station.

In some examples of the method, apparatus, and non-transitory computer-readable medium described above, the data slot partition information of the serving station comprises gap out information indicative of one or more slots available for communication between the end device and the relay device.

Some examples of the method, apparatus, and non-transitory computer-readable medium described above may further include processes, features, means, or instructions for transmitting the determined resource assignment information to the end device via a PDCCH of the relay device.

In some examples of the method, apparatus, and non-transitory computer-readable medium described above, determining resource assignment information further comprises: determining the resource assignment information based at least in part on available resources of the relay device.

In some examples of the method, apparatus, and non-transitory computer-readable medium described above, synchronizing further comprises: transmitting a discovery signal to the end device. Some examples of the method, apparatus, and non-transitory computer-readable medium described above may further include processes, features, means, or instructions for receiving an association signal from the end device. Some examples of the method, apparatus, and non-transitory computer-readable medium described above may further include processes, features, means, or instructions for transmitting the resource assignment information to the end device, the resource assignment information comprising hop path information.

Some examples of the method, apparatus, and non-transitory computer-readable medium described above may further include processes, features, means, or instructions for determining the resource assignment information based at least in part on the received association signal.

In some examples of the method, apparatus, and non-transitory computer-readable medium described above, synchronizing further comprises: broadcasting a discovery signal to the end device, the discovery signal comprising a chirp configuration. Some examples of the method, apparatus, and non-transitory computer-readable medium described above may further include processes, features, means, or instructions for receiving a chirp signal based on the chirp configuration from the end device, the chirp signal comprising end device identification (ID) information and a buffer status report (BSR). Some examples of the method, apparatus, and non-transitory computer-readable medium described above may further include processes, features, means, or instructions for transmitting resource assignment information to the end device, the resource assignment information based at least in part on the received chirp signal.

In some examples of the method, apparatus, and non-transitory computer-readable medium described above, synchronizing further comprises: broadcasting a discovery signal to multiple end devices, the discovery signal comprising occupied data slots. Some examples of the method, apparatus, and non-transitory computer-readable medium described above may further include processes, features, means, or instructions for reserving an unoccupied data slot for one of the multiple end devices. Some examples of the method, apparatus, and non-transitory computer-readable medium described above may further include processes, features, means, or instructions for transmitting resource assignment information to the one of the multiple end devices, the resource assignment information based at least in part on the occupied data slots and the reserved unoccupied data slot.

A method of wireless communication is described. The method may include performing a synchronization procedure with a relay device, transmitting, to the relay device, relay control information comprising resource assignment information for the relay device, and receiving a data packet from the relay device, the data packet transmitted to the relay device from the end device after the end device has synchronized with the relay device, the data packet being received at the serving station in accordance with the resource assignment information for the relay device.

An apparatus for wireless communication is described. The apparatus may include means for performing a synchronization procedure with a relay device, means for transmitting, to the relay device, relay control information comprising resource assignment information for the relay device, and means for receiving a data packet from the relay device, the data packet transmitted to the relay device from the end device after the end device has synchronized with the relay device, the data packet being received at the serving station in accordance with the resource assignment information for the relay device.

Another apparatus for wireless communication is described. The apparatus may include a processor, memory in electronic communication with the processor, and instructions stored in the memory. The instructions may be operable to cause the processor to perform a synchronization procedure with a relay device, transmit, to the relay device, relay control information comprising resource assignment information for the relay device, and receive a data packet from the relay device, the data packet transmitted to the relay device from the end device after the end device has synchronized with the relay device, the data packet being received at the serving station in accordance with the resource assignment information for the relay device.

A non-transitory computer readable medium for wireless communication is described. The non-transitory computer-readable medium may include instructions operable to cause a processor to perform a synchronization procedure with a relay device, transmit, to the relay device, relay control information comprising resource assignment information for the relay device, and receive a data packet from the relay device, the data packet transmitted to the relay device from the end device after the end device has synchronized with the relay device, the data packet being received at the serving station in accordance with the resource assignment information for the relay device.

In some examples of the method, apparatus, and non-transitory computer-readable medium described above, transmitting control information to the relay device comprises: transmitting the control information via a PDCCH of the serving station.

In some examples of the method, apparatus, and non-transitory computer-readable medium described above, transmitting control information to the relay device comprises: transmitting resource assignment information for at least one of the relay device or the end device.

In some examples of the method, apparatus, and non-transitory computer-readable medium described above, transmitting control information to the relay device comprises: transmitting data slot partition information of the serving station or gap out information indicative of one or more slots available for communication between the end device and the relay device.

A method of wireless communication is described. The method may include receiving a primary synchronization signal (PSS) from a serving station, synchronizing with a relay device based at least in part on the PSS received from the serving station, receiving resource assignment information from the serving station, and transmitting, to the relay station, a data packet to be transmitted to the serving station, the transmitting based at least in part on resource assignment information received from the serving station.

An apparatus for wireless communication is described. The apparatus may include means for receiving a PSS from a serving station, means for synchronizing with a relay device based at least in part on the PSS received from the serving station, means for receiving resource assignment information from the serving station, and means for transmitting, to the relay station, a data packet to be transmitted to the serving station, the transmitting based at least in part on resource assignment information received from the serving station.

Another apparatus for wireless communication is described. The apparatus may include a processor, memory in electronic communication with the processor, and instructions stored in the memory. The instructions may be operable to cause the processor to receive a PSS from a serving station, synchronize with a relay device based at least in part on the PSS received from the serving station, receive resource assignment information from the serving station, and transmit, to the relay station, a data packet to be transmitted to the serving station, the transmitting based at least in part on resource assignment information received from the serving station.

A non-transitory computer readable medium for wireless communication is described. The non-transitory computer-readable medium may include instructions operable to cause a processor to receive a PSS from a serving station, synchronize with a relay device based at least in part on the PSS received from the serving station, receive resource assignment information from the serving station, and transmit, to the relay station, a data packet to be transmitted to the serving station, the transmitting based at least in part on resource assignment information received from the serving station.

In some examples of the method, apparatus, and non-transitory computer-readable medium described above, receiving assignment information comprises: receiving resource assignment information via a PDCCH of the serving station.

A method of wireless communication is described. The method may include synchronizing with a relay device, receiving resource assignment information from the relay device, and transmitting, to the relay station, a data packet to be transmitted to the serving station, the transmitting based at least in part on resource assignment information received from the relay.

An apparatus for wireless communication is described. The apparatus may include means for synchronizing with a relay device, means for receiving resource assignment information from the relay device, and means for transmitting, to the relay station, a data packet to be transmitted to the serving station, the transmitting based at least in part on resource assignment information received from the relay.

Another apparatus for wireless communication is described. The apparatus may include a processor, memory in electronic communication with the processor, and instructions stored in the memory. The instructions may be operable to cause the processor to synchronize with a relay device, receive resource assignment information from the relay device, and transmit, to the relay station, a data packet to be transmitted to the serving station, the transmitting based at least in part on resource assignment information received from the relay.

A non-transitory computer readable medium for wireless communication is described. The non-transitory computer-readable medium may include instructions operable to cause a processor to synchronize with a relay device, receive resource assignment information from the relay device, and transmit, to the relay station, a data packet to be transmitted to the serving station, the transmitting based at least in part on resource assignment information received from the relay.

In some examples of the method, apparatus, and non-transitory computer-readable medium described above, synchronizing further comprises: receiving resource assignment information via a PDCCH of the relay device.

In some examples of the method, apparatus, and non-transitory computer-readable medium described above, the resource assignment information may be determined based at least in part on available resources of the relay device.

In some examples of the method, apparatus, and non-transitory computer-readable medium described above, synchronizing further comprises: receiving a discovery signal from the relay device. Some examples of the method, apparatus, and non-transitory computer-readable medium described above may further include processes, features, means, or instructions for transmitting an association signal to the relay device. Some examples of the method, apparatus, and non-transitory computer-readable medium described above may further include processes, features, means, or instructions for receiving the resource assignment information from the relay device, the resource assignment information comprising hop path information.

In some examples of the method, apparatus, and non-transitory computer-readable medium described above, the resource assignment information may be determined based at least in part on the association signal.

In some examples of the method, apparatus, and non-transitory computer-readable medium described above, synchronizing further comprises: receiving a discovery signal from the relay device, the discovery signal comprising a chirp configuration. Some examples of the method, apparatus, and non-transitory computer-readable medium described above may further include processes, features, means, or instructions for transmitting a chirp signal based on the chirp configuration, the chirp signal comprising end device ID information and a BSR. Some examples of the method, apparatus, and non-transitory computer-readable medium described above may further include processes, features, means, or instructions for receiving resource assignment information from the relay device, the assignment information based at least in part on the received chirp signal.

DETAILED DESCRIPTION

Figure 1:
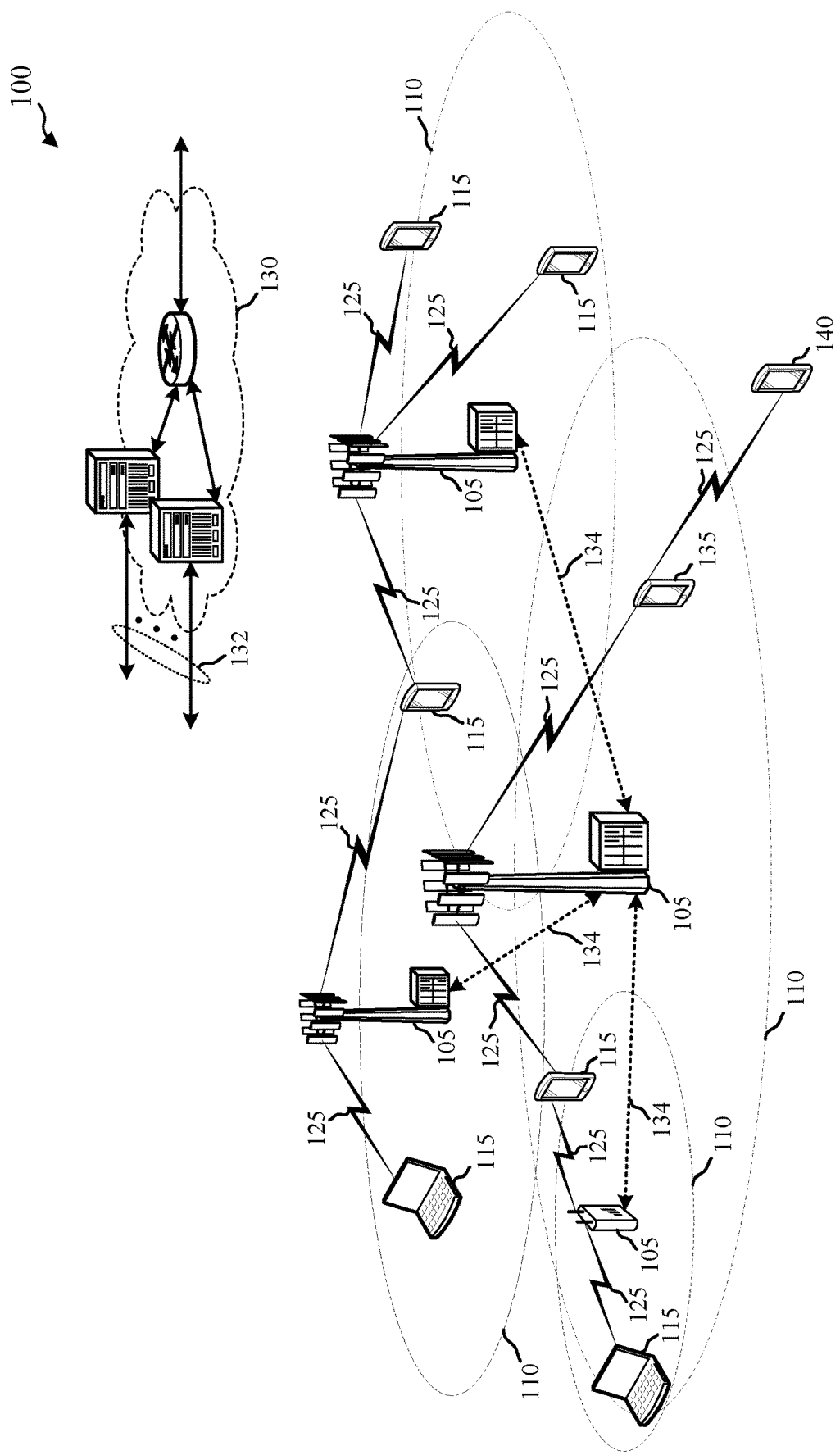
FIG. 1 illustrates an example of a multi-hop wireless communications system that supports traffic scheduling in accordance with aspects of the present disclosure.

Techniques for traffic scheduling (e.g., assignment of resource blocks, time slots, connection identification information, etc., to one or more user equipment (UEs) for uplink (UL) and/or downlink (DL) transmission) in a multi-hop wireless communications system are described. In some wireless communications systems, an end device UE may communicate with a serving station using a relay UE. If multiple end device UEs are using the same relay UE to communicate with a serving station, or if multiple relay UEs supporting one or more end device UEs are communicating with the same serving station, collisions or interference between transmission signals may occur. In such instances, although a retransmission procedure, such as Hybrid Automatic Repeat Request (HARQ), may be performed, the retransmission may also experience collisions and/or interference (e.g., if a data transmission (or retransmission) from multiple UEs is performed on the same channel or within the same time slot of a frame). As discussed herein, techniques for scheduling traffic between UEs (e.g., end device UEs, relay UEs) and serving stations are provided which may be utilized to reduce signal collisions and/or interference between such devices in multi-hop communications systems.

In certain examples, end device UEs may transmit data almost continuously or over long periods of time, while remaining inactive only for brief periods. On the other hand, some end device UEs may include a small battery, but are designed to last a long time. To do so, the end device UE may have short awake (i.e., active) cycles where data may be transmitted or received and long sleep (i.e., inactive) cycles where the end device UE does not typically transmit or receive data. Examples of such end device UEs may include a temperature sensor, a humidity sensor, a pressure sensor, a water leak detector, an audible alarm, among many others. Such devices may be referred to as Internet of Everything (IoE) devices.

IoE devices or other end device UEs may be configured to communicate periodically or sporadically. In sporadic communication, the end device UE may transmit data based on the occurrence of a particular event (e.g., when an ambient temperature is within a certain range or upon detection of a water leak). In periodic communication, the end device UE may transmit data periodically in predetermined frame periods. The predetermined frame periods may be based on energy for transmission, among other factors. Alternatively, though still periodic, transmission of data may occur at different periodicities. For example, for a transmission period, T, data may be transmitted in multiples of T (e.g., $2^kT$, where $k=0, 1, 2, 3, \ldots$) or data may be transmitted in multiples of 2T (e.g., $2^k2T$, where $k=0, 1, 2, 3, \ldots$). Accordingly, methods and systems for efficiently scheduling periodic and sporadic traffic between an end device UE, a relay UE, and a serving station are provided and may be utilized to reduce (or minimize) signaling or energy exhausted by the end device UE.

In some aspects, traffic scheduling may be determined by a serving station in communication with a relay UE or a core network in communication with the serving station. The relay UE in communication with the serving station may also be in communication with an end device UE and serve as an intermediary device for data exchange between the end device and the serving station.

In some examples, the serving station may provide the relay UE and/or the end device UE with control information that contains assignment information for the relay UE and the end device UE. In other aspects, the serving station may provide control information that contains assignment information for only the relay UE. In such cases, the relay UE may determine appropriate assignment information for the end device UE and transmit the determined assignment information to the end device UE.

In other aspects, a serving station may partition one or more frames into one or more data slots that may be allocated for communication with the relay UE and/or the end device UE. For example, the serving station may provide gap out information indicating one or more data slots in which the serving station will not be performing transmission. The one or more data slots may then be used for communication between the relay UE and the end device UE. In some examples, the relay UE may reserve one or more unoccupied data slots and assign at least a portion of one or more reserved data slots to the end device UE.

Aspects of the disclosure are initially described in the context of a wireless communication system. Aspects of the disclosure are also illustrated by and described in the context of process flows, examples of traffic scheduling, and flow charts, each of which support traffic scheduling in a multi-hop wireless communications system. Aspects of the disclosure are further illustrated by and described with reference to apparatus diagrams, system diagrams, and flowcharts that relate to traffic scheduling in a multi-hop wireless communications system.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. The wireless communications system 100 may support traffic scheduling in a multi-hop wireless communications system in which a relay UE 135 may relay information from an end device UE 140 to a base station 105. For example, a UE 115 may be considered a relay UE 135 when serving as an intermediary device between end device UE 140 and a base station 105. The relay UE 135 may be capable of communicating with one or more end device UEs 140 and one or more base stations 105. An end device UE 140 may be an IoE device, as described above, and/or may be capable of performing the same functions as a relay UE 135 should another end device UE 140 establish or attempt to establish communication. In some examples, traffic scheduling between one or more of the base stations 105, relay UEs 135, and end device UEs 140 may be determined by a base station 105, a core network 130, and/or the relay UE 135.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, an IoE device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A physical downlink control channel (PDCCH) carries downlink control information (DCI) in at least one control channel element (CCE), which may consist of nine logically contiguous resource element groups (REGs), where each REG contains 4 resource elements (REs). DCI includes information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs multiple input multiple output (MIMO), the DCI must include additional signaling information. DCI size and format depend on the amount of information as well as factors such as bandwidth, the number of antenna ports, and duplexing mode.

The PDCCH may carry DCI messages associated with multiple UEs, and each UE 115 may decode the DCI messages that are intended for it. For example, each UE 115 may be assigned a cell radio network temporary identity (C-RNTI) and cyclic redundancy check (CRC) bits attached to each DCI may be scrambled based on the C-RNTI. To reduce power consumption and overhead at the UE, a limited set of CCE locations may be specified for DCI associated with a specific UE 115. CCEs may be grouped (e.g., in groups of 1, 2, 4 and 8 CCEs), and a set of CCE locations in which the UE may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information (SI), random access procedures and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

In some cases, wireless communications system 100 may utilize one or more enhanced component carriers (eCCs). An eCC may be characterized by one or more features including: flexible bandwidth, different transmission time intervals (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum).

An eCC characterized by flexible bandwidth may include one or more segments that may be utilized by UEs 115 that are not capable of monitoring the whole bandwidth or prefer to use a limited bandwidth (e.g., to conserve power). In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1 ms TTIs, whereas an eCC may use a TTI length of a single symbol, a pair of symbols, or a slot. In some cases, a shorter symbol duration may also be associated with increased subcarrier spacing.

In conjunction with the reduced TTI length, an eCC may utilize dynamic time division duplex (TDD) operation (i.e., an eCC may switch from DL to UL operation for short bursts according to dynamic conditions). Flexible bandwidth and variable TTIs may be associated with a modified control channel configuration (e.g., an eCC may utilize an enhanced physical downlink control channel (ePDCCH) for DCI). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional HARQ related control information.

Figure 2:
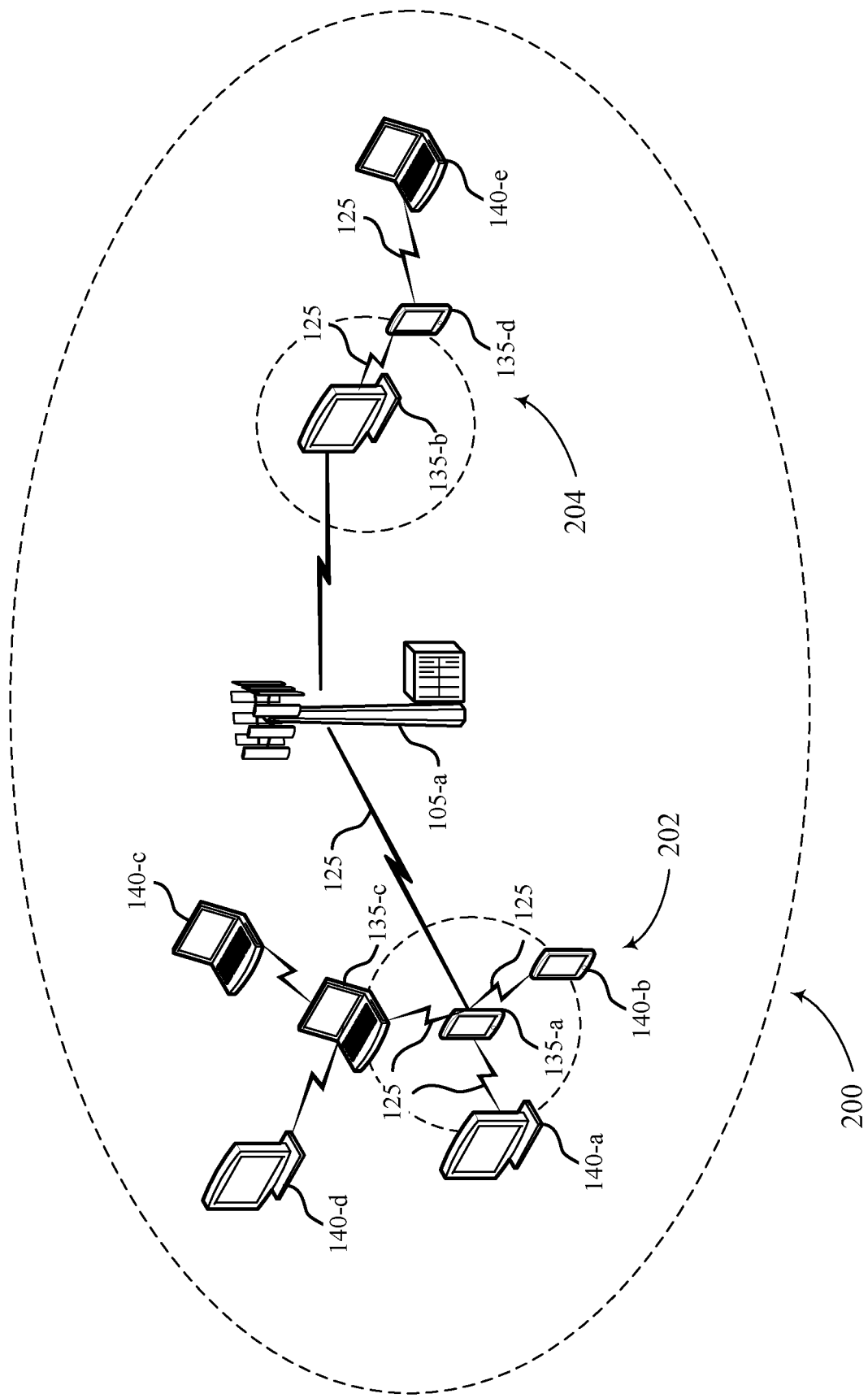
FIG. 2 illustrates an example of a multi-hop wireless communications system that supports traffic scheduling in accordance with aspects of the present disclosure.

FIG. 2 illustrates an example of a wireless communications system 200 that supports traffic scheduling in accordance with the present disclosure. Wireless communications system 200 may include base station 105-a and multiple UEs in the form of relay UEs 135-a, 135-b, 135-c, and 135-d and end device UEs 140-a, 140-b, 140-c, 140-d, and 140-e, which may be examples of the corresponding devices described with reference to FIG. 1. As shown in network 202, UE 135-a serves as a relay UE for end device UEs 140-a, 140-b, and relay UE 135-c. End device UEs 140-a, 140-b, and relay UE 135-c may exchange data with base station 105-a through relay UE 135-a. For example, end device UE 140-b may transmit a data packet to relay UE 135-a. Thereafter, relay UE 135-a may transmit the data packet received from end device UE 140-b to base station 105-a.

At each transmission, acknowledgement (ACK) and negative ACK (NACK) signals may be transmitted to indicate whether a transmitted data packet was successfully received (ACK) or unsuccessfully received (NACK). For example, in a successful multi-hop transmission between relay UE 135-a and end device UE 140-b, relay UE 135-a may transmit an ACK signal to end device UE 140-b upon successful receipt of the data packet sent by end device UE 140-b. After successful transmission of the data packet from relay UE 135-a to base station 105-a, the base station 105-a may transmit an ACK signal to relay UE 135-a acknowledging receipt of the data packet. In turn, relay UE 135-a may transmit the ACK to the end device UE 140-b to confirm that base station 105-a successfully received the data packet sent by end device UE 140-b.

In some examples, wireless communications system 200 may include a relay UE 135-b in communication with another relay UE 135-d. For example, as shown in network 204, end device UE 140-e is in communication with relay UE 135-d. Relay UE 135-d is also in communication with relay UE 135-b. In such an example, end device UE 140-e may exchange data with base station 105-a using relay UE 135-d and relay UE 135-b. End device UE 140-e may transmit a data packet to relay UE 135-d. Relay UE 135-d may then transmit the data packet to relay UE 135-b, which transmits the data packet to the base station 105-a. If the transmission is successfully received, base station 105-a may transmit an ACK signal to relay UE 135-b that is transmitted on to end device UE 140-e through relay UE 135-d. Similar to that explained above, at each transmission, ACK and NACK signals may be transmitted and/or received between end device UEs 140-a, 140-b, 140-c, 140-d, and 140-e, relay UEs 135-a, 135-b, 135-c, and 135-d, and base stations 105-a, to indicate whether reception of a transmitted data packet was successfully received (ACK) or unsuccessfully received (NACK).

In certain examples, wireless communications system 200 may include a relay UE 135-a in communication with another relay UE 135-c which is in communication with multiple end device UEs 140-c and 140-d. For example, as shown in network 202, end device UEs 140-c and 140-d are in communication with relay UE 135-c. Relay UE 135-c is in communication with base station 105-a using relay UE 135-a. In wireless communications system 200 (e.g., in networks 202 and 204), as one or more relay UEs 135-a, 135-b, 135-c, and 135-d may be in communication with base stations 105-a as well as with multiple end device UEs 140-a, 140-b, 140-c, 140-d, and 140-e, the potential for interference between transmitted signals increases and scheduling resources for such wireless communications system 200 may be helpful in preventing, or otherwise mitigating, data loss due to interference and/or transmission collisions.

Figure 3A:
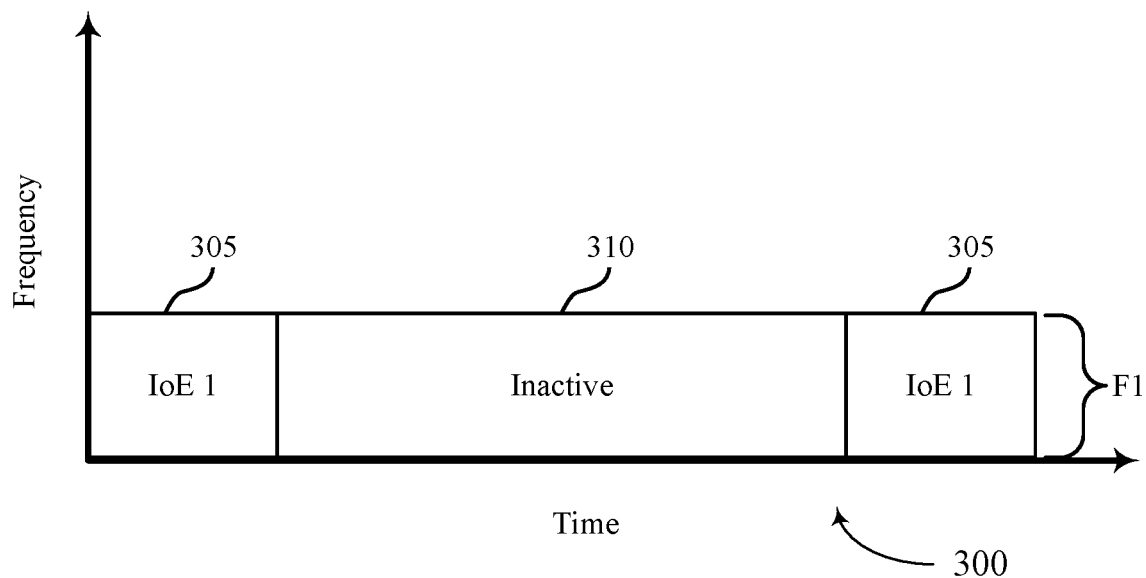
FIGS. 3A-3B illustrate example frame structures in a multi-hop wireless communications system in accordance with aspects of the present disclosure.
Figure 3B:
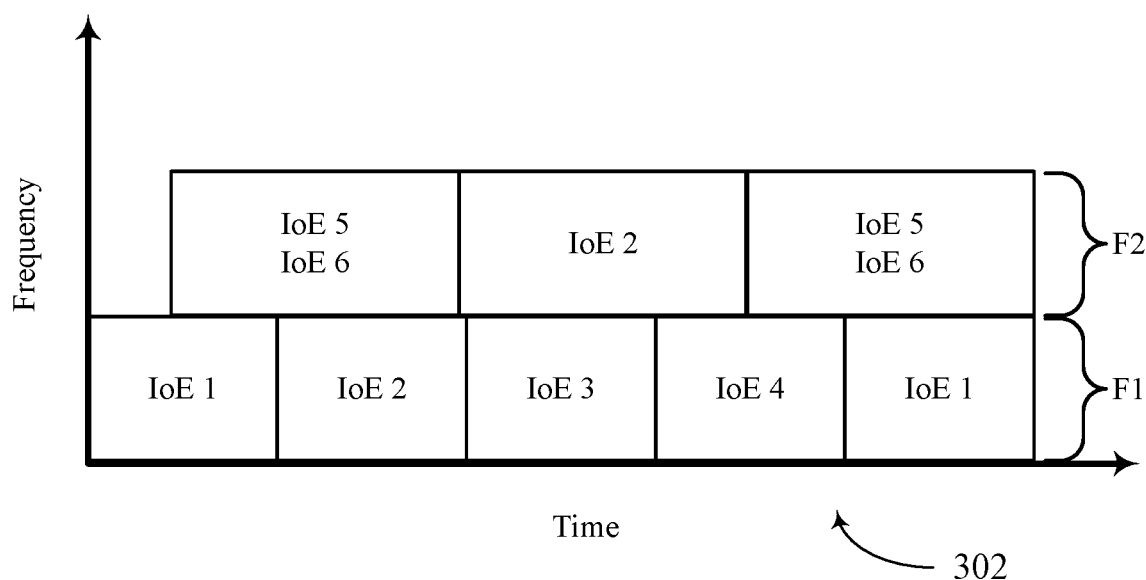

FIGS. 3A-3B illustrate example frame structures in a multi-hop wireless communications system in accordance with aspects of the present disclosure. In some cases, frame structures 300 and 302 may represent aspects of a UE 115 or base station 105 as described with reference to FIGS. 1-2. In FIG. 3A, a frequency vs. time plot of a frame structure 300 is shown which represents resources allocated for a UE in accordance with various aspects of the present disclosure. As discussed above, in some examples, a UE 115 may be an IoE device (IoE 1). In FIG. 3A, IoE 1 is allocated resources in channel F1, but remains inactive during most of the allocated time. For example, IoE 1 is shown having short awake cycles 305 where transmission and reception may occur separated by a long sleep cycle 310 where IoE 1 is inactive and transmission and reception do not occur.

In some examples, and as shown in FIG. 3A, the awake cycles 305 of IoE 1 are periodic. Because IoE 1 remains inactive for most of the time allocated to IoE 1, multiple IoE devices may be assigned to the same channel at different time slots. When multiple IoE devices are assigned to same channel at different time slots, the frame may be referred to as a super-frame, e.g., frame structure 302 in FIG. 3B. In FIG. 3B, multiple IoE devices IoE 1, IoE 2, IoE 3, IoE 4, IoE 5, and IoE 6, are allocated resources in channels F1 and F2. Frame lengths for frames may differ between channels. As shown, F2 frame lengths are longer than the frame lengths of the frames in channel F1. In some examples, UEs or IoE devices may be allocated resources in each of channels F1 and F2. As shown, IoE 2 is allocated resources in both F1 and F2. In addition, if the periodicity of awake cycles 305 for multiple devices does not overlap, multiple devices may be allocated resources in a single frame. For example, IoE 5 and IoE 6 are allocated resources in the same time slot in channel F2.

While frame lengths in channel F1 may differ from frame lengths in channel F2, each frame may include a number of data slots. One or more data slots of a given frame may be allocated to the IoE assigned to the given frame. In some examples, a portion of data slots for a given frame may be allocated to one IoE and a portion of (or all of) the remaining data slots for the given frame may be allocated to another IoE, as illustrated by the allocation of resources to IoE 5 and IoE 6 in FIG. 3B. The number of data slots in a particular frame may be determined to allow for end to end data transfer (end device UE exchanging data with a base station over a multi-hop path using one or more relay UEs) with ACK/NACK in a single frame in which an end device is awake. In accordance with various aspects of the present disclosure, traffic scheduling may be efficiently performed by allocating resources according to periodicity and/or adjusting frame length and number of data slots based on channel availability and data to be transferred, as shown in FIG. 3B.

Figure 4A:
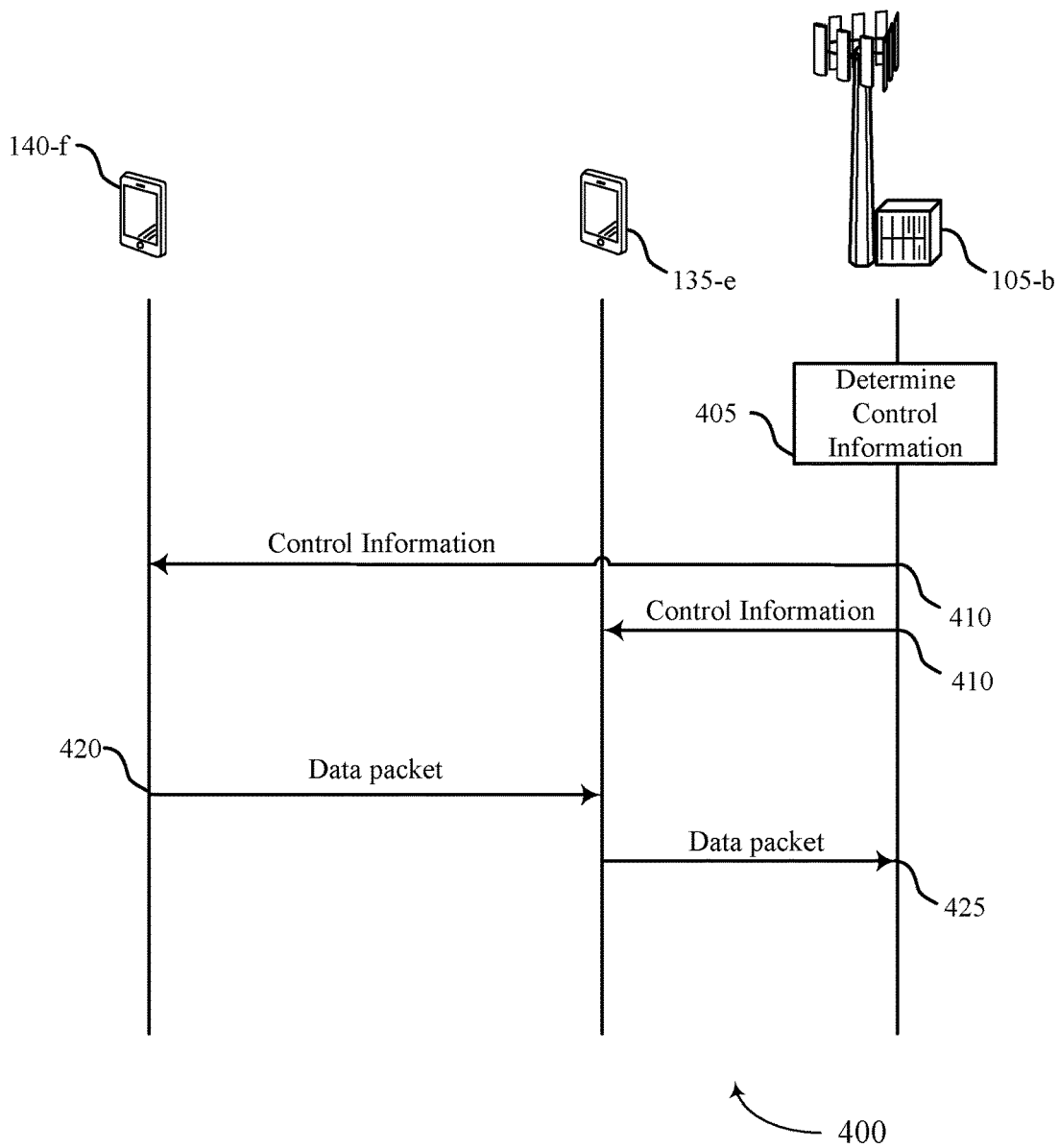
FIGS. 4A-4B illustrate an example scheduling mode in a multi-hop wireless communications system in accordance with aspects of the present disclosure.
Figure 4B:
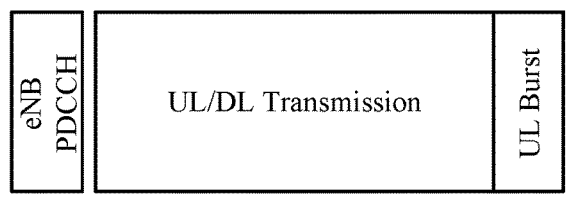

FIGS. 4A-4B illustrate an example scheduling mode in a multi-hop wireless communications system in accordance with aspects of the present disclosure. In some cases, the example scheduling flow 400 may represent aspects of techniques performed by a UE 115 or base station 105 as described with reference to FIGS. 1-2. Scheduling flow 400 illustrates the scheduling of UL transmission between end device UE 140-*f*, relay UE 135-*e*, and base station 105-*b*. Although the illustrated scheduling flow 400 represents UL transmission, it should be understood that DL transmission may be additionally or alternatively scheduled without departing from the scope of the present disclosure. In addition, although single hop scheduling is shown (i.e., only a single relay UE 135-*e* is realized), traffic scheduling between multiple relay UEs 135-*e* and multiple end device UEs 140-*f* may be scheduled according to scheduling flow 400.

At 405 in scheduling flow 400, the base station 105-*b* determines control information for communication between base station 105-*b* and relay UE 135-*e*, base station 105-*b* and end device 140-*f*, and relay UE 135-*e* and end device 140-*f*. The control information may be determined based on available resources (resource blocks (RBs), time slots, etc.), or number of UEs in the communication system, among other factors. Control information may include hop-path information, assignment information (RB allocation, transmission channel, and/or time slots, etc.), connection identification information (temporary device ID, etc.), number of data slots in one or more frames, frame length, base station identifying information (base station location, base station type, etc.). In some examples, the control information may be determined by another network node (e.g., such as core network 130 in FIG. 1) and transmitted to the base station 105-*b* over a backhaul communication link.

Once the base station 105-*b* determines or otherwise obtains the control information, the base station 105-*b* transmits the control information to both the relay UE 135-*e* and the end device UE 140-*f* at 410. The control information may include assignment information for the relay UE 135-*e* as well as assignment information for the end device UE 140-*f*. Based on the received assignment information transmitted to the end device 140-*f* at 410, the end device 140-*f* may transmit a data packet to relay UE 135-*e* at 415. The relay UE 135-*e* may then transmit the data packet received from the end device 140-*f* to the base station 105-*b* at 420 and may transmit the data packet based on the control information transmitted to the relay UE 135-*e* at 410. Although not shown, an ACK and/or a NACK signal may be sent from the base station 105-*b* to one or both of the relay UE 135-*e* and the end device UE 140-*f* to indicate successful or unsuccessful reception of the data packet. The ACK/NACK signals may be included with other transmissions (e.g., data packet transmission) or sent separately.

In FIG. 4B, a frame structure 450 that represents the traffic scheduling in scheduling flow 400 is shown. In this example, the frame structure 450 includes a PDCCH transmitted by an eNB (e.g., base station 105-*b*). Using the eNB PDCCH, control information may be transmitted to the relay UE 135-*e* and the end device UE 140-*f*. Once control information is received and acknowledged, UL and/or DL transmission may occur in one or more slots following the PDCCH. After the UL and/or DL transmission, an UL burst may be transmitted to indicate subsequent traffic and/or request additional resources, for example.

In accordance with the aspects disclosed in FIGS. 4A-4B, the base station 105-*b* and/or the network (e.g., core network 130) has most of the control of the communication between end device UE 140-*f*, relay UE 135-*e*, and the base station 105-*b*. In doing so, data transmission interference and collisions in communication links (e.g., communication links 125 in FIG. 1) may be prevented by assigning resources that avoid signal overlap. In addition, relay UE 135-*e* does not have additional overhead that would be needed if the relay UE 135-*e* was to perform scheduling for one or more end device UEs 140-*f*. Buffer Status Reports (BSRs) from the relay UE 135-*e* to the base station 105-*b* may include information from the end device UE 140-*f* (e.g., BSRs from end device UE 140-*f* and channel quality between the end device UE 140-*f* and the relay UE 135-*e*). In some examples, as the control information transmitted in 410 may include hop path information, end device UE 140-*f* may be notified that or otherwise aware of connecting to the relay UE 135-*e* instead of base station 105-*b*.

Figure 5A:
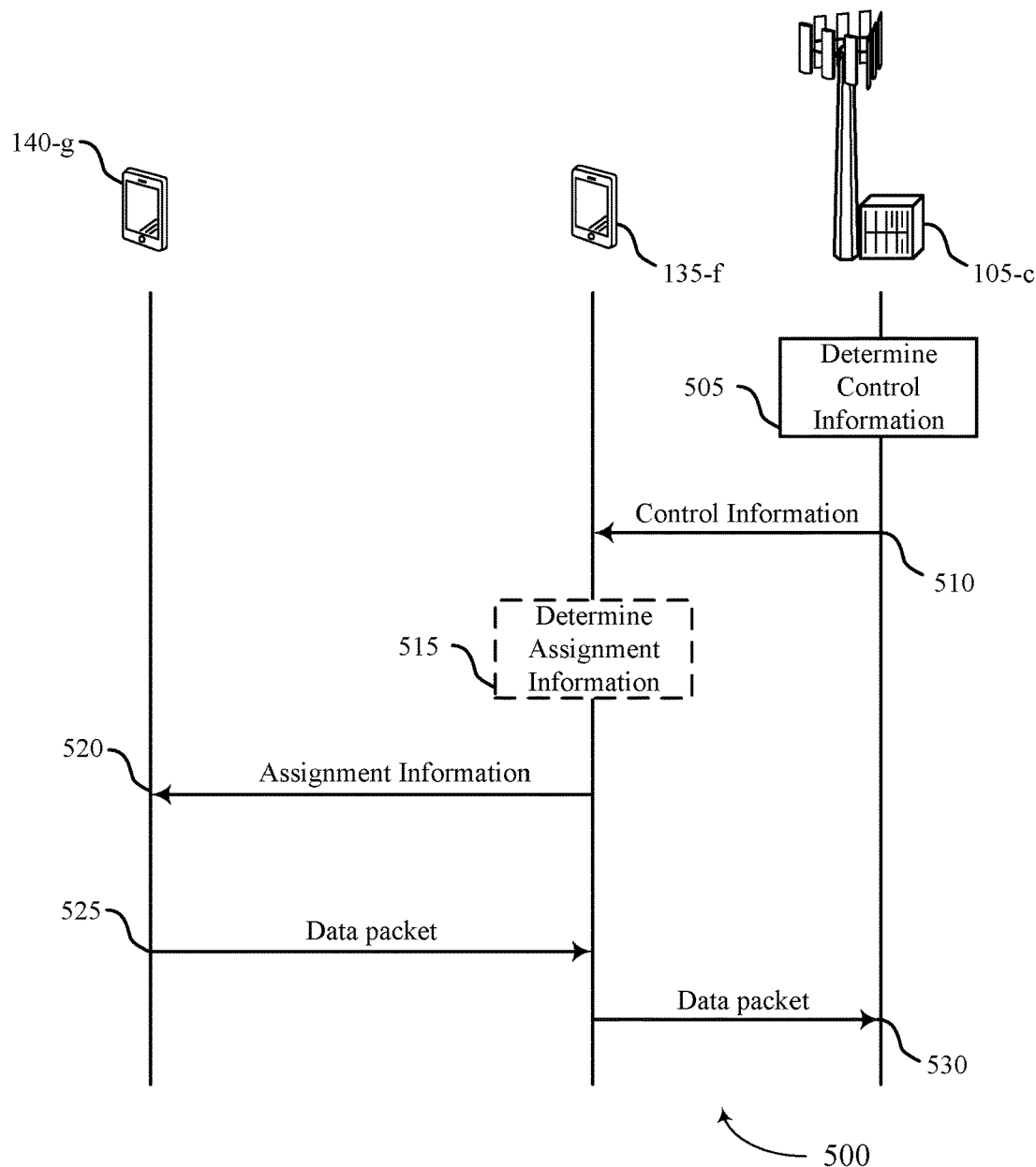
FIGS. 5A-5B illustrate an example scheduling mode in a multi-hop wireless communications system in accordance with aspects of the present disclosure.
Figure 5B:
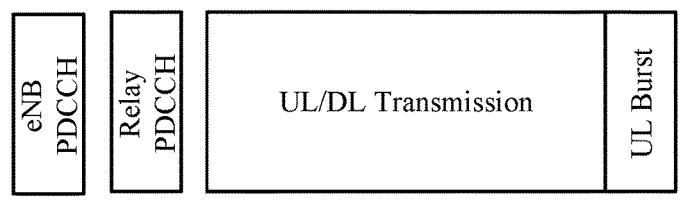

FIGS. 5A-5B illustrate an example scheduling mode in a multi-hop wireless communications system in accordance with aspects of the present disclosure. In some cases, the example scheduling flow 500 may represent aspects of techniques performed by a UE 115 or base station 105 as described with reference to FIGS. 1-2. Scheduling flow 500 illustrates the scheduling of UL transmission between end device UE 140-*g*, relay UE 135-*f*, and base station 105-*c*. Although the illustrated scheduling flow 500 represents UL transmission, it should be understood that DL transmission may be additionally or alternatively scheduled without departing from the scope of the present disclosure. In addition, although single hop scheduling is shown (i.e., only a single relay UE 135-*f* is realized), traffic scheduling between multiple relay UEs 135-*f* and multiple end device UEs 140-*g* may be scheduled according to scheduling flow 500.

At 505 in scheduling flow 500, the base station 105-*c* determines control information for communication between base station 105-*c* and relay UE 135-*f* and/or communication between relay UE 135-*f* and end device UE 140-*g*. The control information may be determined based on available resources (RBs, time slots, etc.), number of UEs in the communication system, among other factors. Control information may include hop-path information, assignment information (RB allocation, transmission channel, and/or time slots, etc.), connection identification information (temporary device ID, etc.), number of data slots in one or more frames, frame length, base station identifying information (base station location, base station type, etc.). In some examples, the control information may be predetermined (e.g., by a core network 130 in FIG. 1) and transmitted to the base station 105-*c* over a backhaul communication link.

Once the base station 105-*c* determines or obtains the control information, the base station 105-*c* transmits the control information to the relay UE 135-*f* at 510. The control information may include assignment information for the relay UE 135-*f* and/or assignment information for the end device UE 140-*g*. If the control information transmitted from the base station 105-*c* to the relay UE 135-*f* only includes assignment information for the relay UE 135-*f*, the relay UE 135-*f* may determine assignment information for the end device UE 140-*g* at 515. The relay UE 135-*f* may determine assignment information based on the control information and/or assignment information transmitted by the base station 105-*c*. For example, the relay UE 135-*f* may determine assignment information for the end device UE 140-*g* based on resources allocated to the relay UE 135-*f* or may determine assignment information to ensure that resources allocated to the end device UE 140-*g* do not conflict with resources allocated to the relay UE 135-*f*, other relays, or other end device UEs in communication with the relay UE 135-*f*.

If the control information transmitted by the base station 105-c includes assignment information for the end device UE 140-g, the relay UE 135-f may ensure that there are no resource allocation conflicts. In either situation, once the assignment information for the end device UE 140-g is determined at 515 or obtained from the control information transmitted by the base station 105-c at 510, the relay UE 135-f transmits the assignment information to the end device 140-g at 520. Based on the assignment information transmitted to the end device UE 140-g, the end device UE 140-g may transmit a data packet to the relay UE 135-f at 525. The relay UE 135-f may then transmit the data packet received from the end device 140-g to the base station 105-c at 530 and may transmit the data packet based on the control information transmitted to the relay UE 135-f at 510. Although not shown, an ACK and/or a NACK signal may be sent from the base station 105-c to the relay UE 135-f to indicate successful or unsuccessful reception of the data packet. The ACK/NACK signals may be included with other transmissions (e.g., data packet transmission) or sent separately.

In FIG. 5B, a frame structure 550 that represents the scheduling in scheduling flow 500 is shown. In this example, the frame structure 550 includes a PDCCH transmitted by an eNB (e.g., base station 105-c). Control information may be transmitted to the relay UE 135-f using the PDCCH. Once control information is received and acknowledged, the relay UE 135-f may determine or confirm assignment information for the end device UE 140-g and transmit the assignment information to the end device UE 140-g using a PDCCH of the relay UE 135-f. UL and/or DL transmission may occur in one or more slots following the Relay PDCCH. After the UL and/or DL transmission, an UL burst may be transmitted to indicate subsequent traffic and/or request additional resources, for example.

In accordance with the aspects disclosed in FIGS. 5A-5B, the base station 105-c and/or the network (e.g., core network 130) has at least partial control of the communication between relay UEs 135-f, end device UEs 140-g, and the base station 105-c. This may help prevent data transmission interference and collisions in communication links (e.g., communication links 125 in FIG. 1) between devices by assigning resources to avoid signal overlap. In addition, relay UE 135-f is capable of determining and/or confirming assignment information for the end device UE 140-g. In some examples, as the control information transmitted in 510 may include hop path information, end device UE 140-g may be notified that or otherwise aware of connecting to the relay UE 135-f instead of base station 105-c.

Figure 6A:
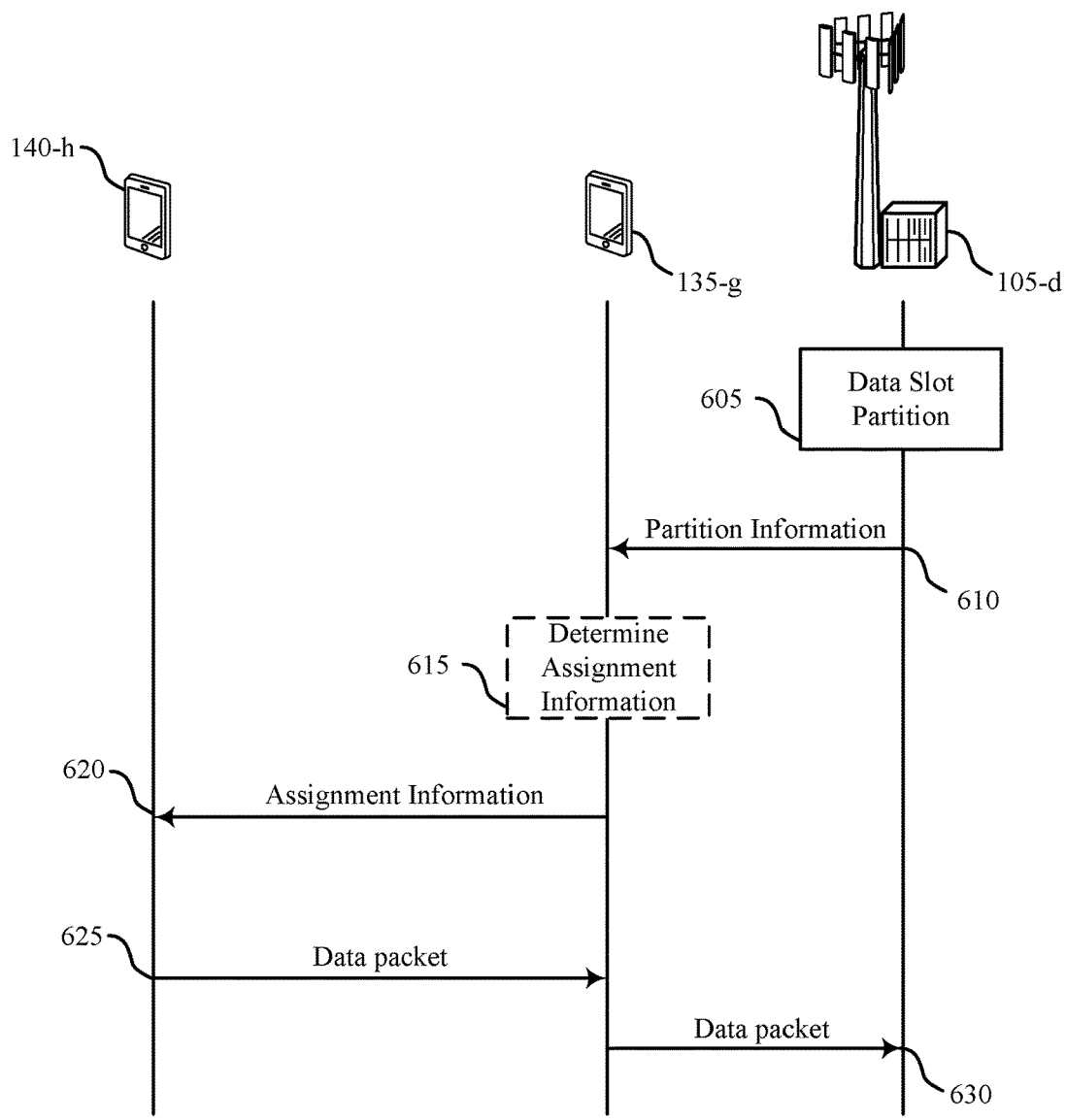
FIGS. 6A-6B illustrate an example scheduling mode in a multi-hop wireless communications system in accordance with aspects of the present disclosure.
Figure 6B:
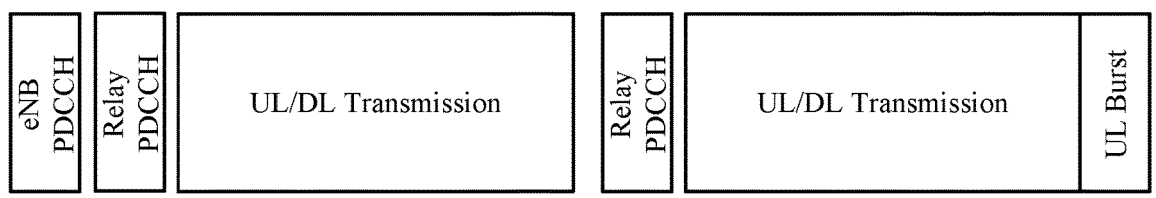

FIGS. 6A-6B illustrate an example scheduling mode in a multi-hop wireless communications system in accordance with aspects of the present disclosure. In some cases, the example scheduling flow 600 may represent aspects of techniques performed by a UE 115 or base station 105 as described with reference to FIGS. 1-2. Scheduling flow 600 illustrates the scheduling of UL transmission between end device UE 140-h, relay UE 135-g, and base station 105-d. Although the illustrated scheduling flow 600 represents UL transmission, it should be understood that DL transmission may be additionally or alternatively scheduled without departing from the scope of the present disclosure. In addition, although single hop scheduling is shown (i.e., only a single relay UE 135-g is realized), traffic scheduling between multiple relay UEs 135-g and multiple end device UEs 140-h may be scheduled according to scheduling flow 600.

At 605 in scheduling flow 600, the base station 105-d partitions frames into a number of data slots for communication between base station 105-d and relay UE 135-g and/or communication between relay UE 135-g and end device 140-h. The data slot partitioning may be performed based on available resources (resource blocks (RBs), time slots, etc.), number of UEs in the communication system, among other factors. For example, one or more frames may be partitioned into a number of data slots and a portion of the partitioned data slots may be allocated for communication between the base station 105-d and the relay UE 135-g and a portion (or all) of the remaining data slots may be allocated for communication between the relay UE 135-g and the end device UE 140-h. In some embodiments, the base station 105-d may gap out data slots allocated for communication between the relay UE 135-g and the end device UE 140-h such that the base station 105-d will not transmit during the gap out slots. Partitioning may be semi-static or dynamic such that data slot lengths may vary.

Once the base station 105-d partitions one or more frames into data slots, the base station 105-d transmits the partition information to the relay UE 135-g at 610. The partition information may include gap out information indicating data slots in which the base station 105-d will not be transmitting and thus, are available for transmission between the relay UE 135-g and the end device UE 140-h.

Based on the partition information, the relay UE 135-g may determine assignment information for the end device UE 140-h at 615. The assignment information may be determined based on resources allocated to the relay UE 135-g, the partition information, and/or gap out information. Once the assignment information for the end device UE 140-h is determined at 615, the relay UE 135-g transmits the assignment information to the end device 140-h at 620. Based on the assignment information transmitted to the end device UE 140-h, the end device UE 140-h may transmit a data packet to the relay UE 135-g at 625. The relay UE 135-g may then transmit the data packet received from the end device 140-h to the base station 105-d at 630 and may transmit the data packet based on the partition information transmitted to the relay UE 135-g at 610. Although not shown, an ACK and/or a NACK signal may be sent from the base station 105-d to the relay UE 135-g to indicate successful or unsuccessful reception of the data packet. The ACK/NACK signals may be included with other transmissions (e.g., data packet transmission) or sent separately.

In FIG. 6B, a frame structure 650 that represents a gap out frame in scheduling flow 600 is shown. In this example, the frame structure 650 includes a PDCCH transmitted by an eNB (e.g., base station 105-d). Partition information may be transmitted to the relay UE 135-g using the PDCCH. Once partition information is received and acknowledged, the relay UE 135-g may determine assignment information for the end device UE 140-h and transmit the assignment information to the end device UE 140-h using a PDCCH of the relay UE 135-g. UL and/or DL transmission may occur in one or more slots following the Relay PDCCH. In this example, after the UL and/or DL transmission, another Relay PDCCH may be used to transmit assignment information for the next one or more frames. As each frame may be partitioned differently, the relay UE 135-g may transmit information multiple times over multiple PDCCHs. At the end of the gap out frame, an UL burst may be transmitted to indicate subsequent traffic and/or request additional resources, for example.

In accordance with the aspects disclosed in FIGS. 6A-6B, the base station 105-d and/or the network (e.g., core network 130) has at least partial control of the communication between relay UEs 135-*g*, end device UEs 140-*h*, and the base station 105-*d*. This may help prevent data transmission interference and collisions in communication links (e.g., communication links 125 in FIG. 1) between devices by partitioning frames into data slots and providing gap out information indicating available data slots for transmission between a relay UE 135-*g* and an end device UE 140-*h* to avoid signal overlap. In some examples, as the partition information transmitted in 610 may include hop path information, end device UE 140-*h* may be notified that or otherwise aware of connecting to the relay UE 135-*g* instead of base station 105-*d*.

Figure 7A:
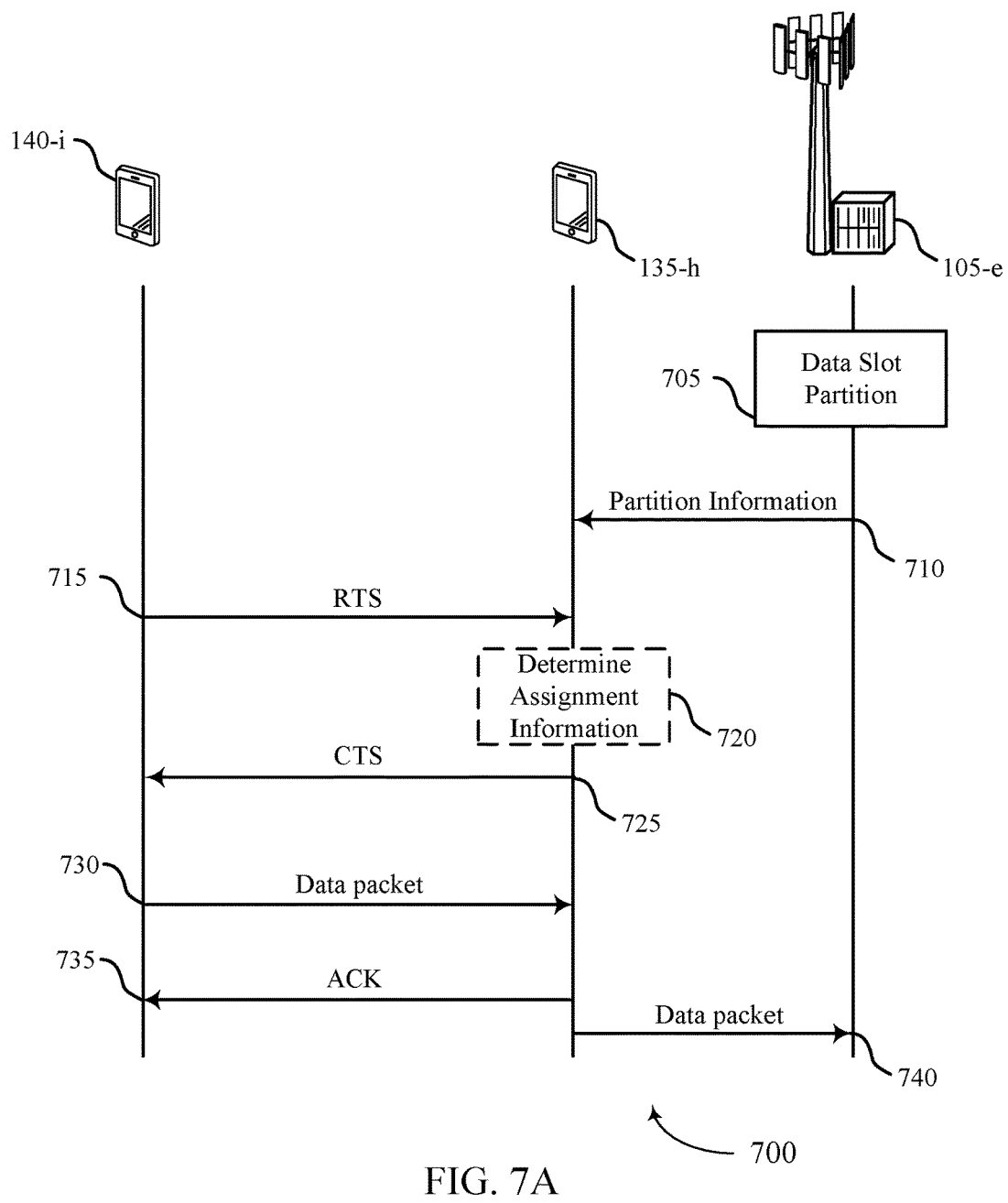
FIGS. 7A-7B illustrate an example scheduling mode in a multi-hop wireless communications system in accordance with aspects of the present disclosure.
Figure 7B:
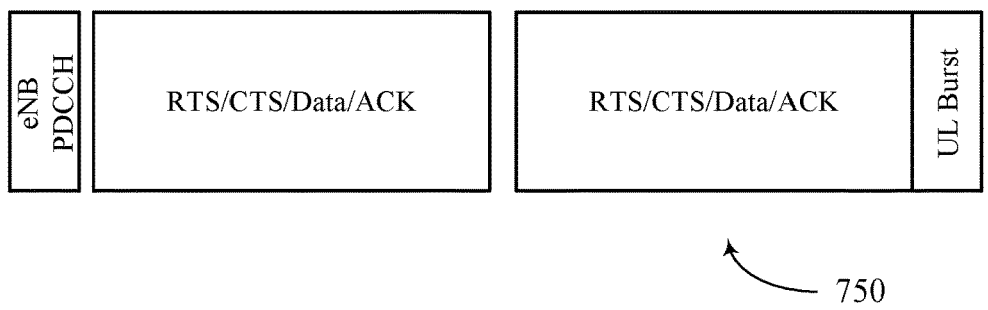

FIGS. 7A-7B illustrate an example scheduling mode in a multi-hop wireless communications system in accordance with aspects of the present disclosure. In some cases, the example scheduling flow 700 may represent aspects of techniques performed by a UE 115 or base station 105 as described with reference to FIGS. 1-2. Scheduling flow 700 illustrates the scheduling of UL transmission between end device UE 140-*i*, relay UE 135-*h*, and base station 105-*e*. Although the illustrated scheduling flow 700 represents UL transmission, it should be understood that DL transmission may be additionally or alternatively scheduled without departing from the scope of the present disclosure. In addition, although single hop scheduling is shown (i.e., only a single relay UE 135-*h* is realized), traffic scheduling between multiple relay UEs 135-*h* and multiple end device UEs 140-*i* may be scheduled according to scheduling flow 700.

At 705 in scheduling flow 700, the base station 105-*e* partitions one or more frames into a number of data slots for communication between base station 105-*e* and relay UE 135-*h* and/or communication between relay UE 135-*h* and end device 140-*i*. The data slot partitioning may be performed based on available resources (RBs, time slots, etc.), number of UEs in the communication system, among other factors. For example, one or more frames may be partitioned into a number of data slots and a portion of the partitioned data slots may be allocated for communication between the base station 105-*e* and the relay UE 135-*h* and a portion (or all) of the remaining data slots may be allocated for communication between the relay UE 135-*h* and the end device UE 140-*i*. In some embodiments, the base station 105-*e* may gap out data slots allocated for communication between the relay UE 135-*h* and the end device UE 140-*i* such that the base station will not transmit during the gap out slots. Partitioning may be semi-static or dynamic such that data slot lengths may vary.

Once the base station 105-*e* partitions one or more frames into data slots, the base station 105-*e* transmits the partition information to the relay UE 135-*h* at 710. The partition information may include gap out information indicating data slots in which the base station 105-*q* will not be transmitting and thus, are available for transmission between the relay UE 135-*h* and the end device UE 140-*i*.

At 715, end device 140-*i* may transmit a request to send (RTS) signal to the relay UE 135-*h* in an attempt to establish communication with the relay UE 135-*h*. Based on the partition information and the RTS signal, the relay UE 135-*h* may determine assignment information for the end device UE 140-*i* at 720. The assignment information may be determined based on resources allocated to the relay UE 135-*h*, the partition information, and/or gap out information. Once the assignment information for the end device UE 140-*i* is determined at 720, the relay UE 135-*h* transmits the assignment information in a clear to send (CTS) signal to the end device 140-*i* at 725. Based on the assignment information transmitted to the end device UE 140-*i*, the end device UE 140-*i* may transmit a data packet to the relay UE 135-*h* at 730. The relay UE 135-*h* may then ACK receipt of the transmitted data packet at 735 and transmit the data packet received from the end device 140-*i* to the base station 105-*e* at 740. Although not shown, an ACK and/or a NACK signal may be sent from the base station 105-*e* to the relay UE 135-*h* to indicate successful or unsuccessful reception of the data packet. The ACK/NACK signals may be included with other transmissions (e.g., data packet transmission) or sent separately.

In FIG. 7B, a frame structure 750 that represents a gap out frame in scheduling flow 700 is shown. In this example, the frame structure 750 includes a PDCCH transmitted by an eNB (e.g., base station 105-*e*). Partition information may be transmitted to the relay UE 135-*h* using the PDCCH. Once partition information is received and acknowledged, the relay UE 135-*h* may determine assignment information for the end device UE 140-*i* after a RTS signal is received from the end device UE 140-*i*. The relay UE 135-*h* may transmit the assignment information to the end device UE 140-*i* in a CTS signal. UL and/or DL transmission may occur in the same slot as the RTS and CTS signals or in one or more slots following the eNB PDCCH. At the end of the gap out frame, an UL burst may be transmitted to indicate subsequent traffic and/or request additional resources, for example.

In accordance with the aspects disclosed in FIGS. 7A-7B, the base station 105-*e* and/or the network (e.g., core network 130) has at least partial control of the communication between relay UEs 135-*h*, end device UEs 140-*i*, and the base station 105-*e*. This may help prevent data transmission interference and collisions in communication links (e.g., communication links 125 in FIG. 1) between devices by partitioning frames into data slots and providing gap out information indicating available data slots for transmission between a relay UE 135-*h* and an end device UE 140-*i* to avoid signal overlap. In some examples, as the partition information transmitted in 610 may include hop path information, end device UE 140-*i* may be notified that or otherwise aware of connecting to the relay UE 135-*h* instead of base station 105-*e*.

Figure 8:
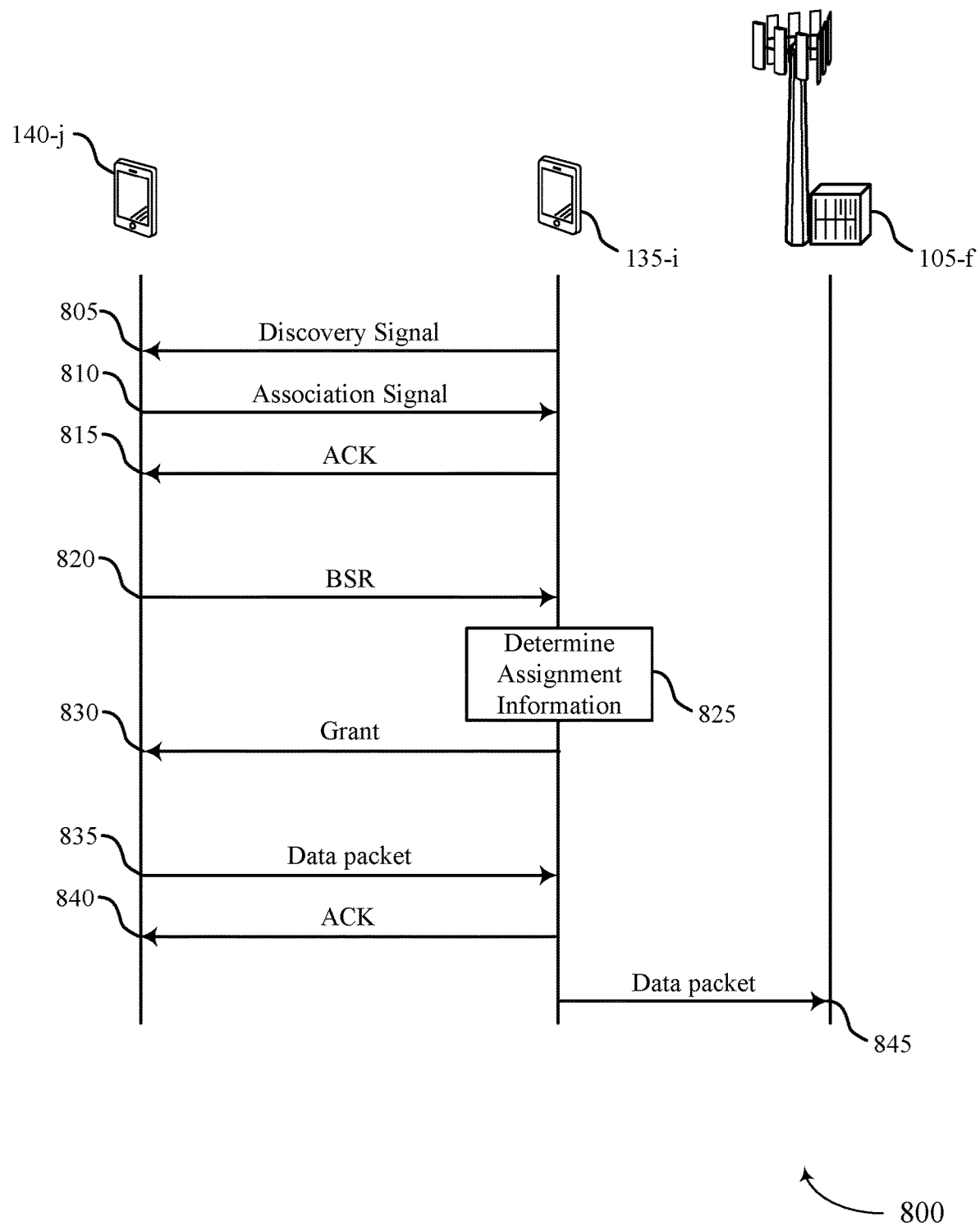
FIG. 8 illustrates an example of periodic communication scheduling in a multi-hop wireless communications system in accordance with aspects of the present disclosure.

FIG. 8 illustrates an example of periodic communication scheduling in a multi-hop wireless communications system in accordance with aspects of the present disclosure. In some cases, the example periodic communication scheduling 800 may represent aspects of techniques performed by a UE 115 or base station 105 as described with reference to FIGS. 1-2. Scheduling flow 800 illustrates the scheduling of periodic UL transmission between end device UE 140-*j*, relay UE 135-*i*, and base station 105-*f*. Although the illustrated scheduling flow 800 represents UL transmission, it should be understood that DL transmission may be additionally or alternatively scheduled without departing from the scope of the present disclosure. In addition, although single hop scheduling is shown (i.e., only a single relay UE 135-*i* is realized), traffic scheduling between multiple relay UEs 135-*i* and multiple end device UEs 140-*j* may be scheduled according to scheduling flow 800.

At 805 in scheduling flow 800, the relay UE 135-*i* transmits a discovery signal to the end device UE 140-*j* in order to synchronize awake cycles of the relay UE 135-*i* with the end device UE 140-*j*. The time at which the discovery signal is transmitted may be predetermined in order to allow for an energy efficient discovery procedure at both transmitting and receiving devices. The discovery signal may include device identification information, device wake schedule, etc. After receipt of the discovery signal, the end device UE 140-*j* may transmit an association signal to the relay UE 135-*i* at 810. The association signal may be transmitted based on the received discovery signal. For example, after the discovery signal is received by the end device UE 140-*j*, the end device 140-*j* may determine an awake cycle for the relay UE 135-*i* and transmit the association signal during the awake cycle of the relay UE 135-*i*. After receipt of the association signal from the end device UE 140-*j*, the relay UE 135-*i* may transmit an ACK signal to the end device UE 140-*j* acknowledging receipt and in some cases, acknowledging a synchronization of awake cycles between the relay UE 135-*i* and the end device UE 140-*j* at 815.

Once the end device UE 140-*j* and the relay UE 135-*i* are synchronized, the end device UE 140-*j* may transmit a BSR signal indicating, for example, an amount of data to be transmitted from the end device UE 140-*j* to the base station 105-*f* using the relay UE 135-*i* at 820. After receiving the BSR signal, the relay UE 135-*i* may determine assignment or other control information at 825 and grant (or otherwise deny) the end device UE 140-*j* permission to send data at 830. The grant may include assignment information and may be transmitted from the relay UE 135-*i* to the end device UE 140-*j*. Once the grant is received at the end device UE 140-*j*, the end device UE 140-*j* may transmit a data packet to the relay UE 135-*i* at 835. The relay UE 135-*i* may transmit an ACK signal to the end device UE 140-*j* indicating successful receipt of the data packet at 840. Thereafter, the relay UE 135-*i* may transmit the data packet received from the end device UE 140-*j* to the base station 105-*f* at 845. Although not shown, an ACK and/or a NACK signal may be sent from the base station 105-*f* to the relay UE 135-*i* to indicate successful or unsuccessful reception of the data packet. The ACK/NACK signals may be included with other transmissions (e.g., data packet transmission) or sent separately. In some examples of periodic transmission, once a relay UE 135-*i* and an end device UE 140-*j* are synchronized, the end device UE 140-*j* may transmit data packets to the relay UE 135-*i* periodically without having to perform a discovery procedure and/or request a grant to send data.

Figure 9:
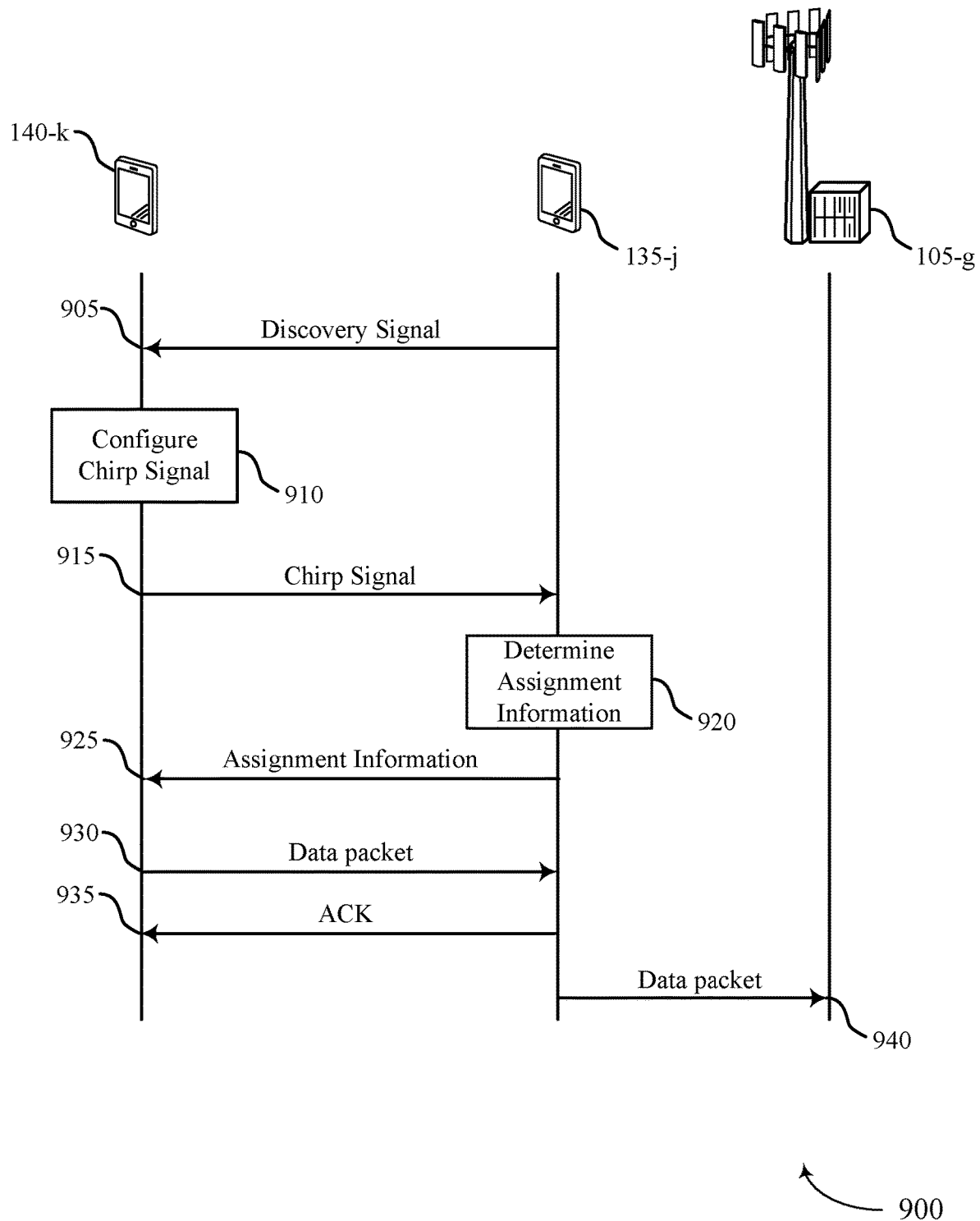
FIG. 9 illustrates an example of sporadic communication scheduling in a multi-hop wireless communications system in accordance with aspects of the present disclosure.

FIG. 9 illustrates an example of sporadic communication scheduling in a multi-hop wireless communications system in accordance with aspects of the present disclosure. In some cases, the example sporadic communication scheduling 900 may represent aspects of techniques performed by a UE 115 or base station 105 as described with reference to FIGS. 1-2. Scheduling flow 900 illustrates the scheduling of sporadic UL transmission between end device UE 140-*k*, relay UE 135-*j*, and base station 105-*g*. Although the illustrated scheduling flow 900 represents UL transmission, it should be understood that DL transmission may be additionally or alternatively scheduled without departing from the scope of the present disclosure. In addition, although single hop scheduling is shown (i.e., only a single relay UE 135-*j* is realized), traffic scheduling between multiple relay UEs and multiple end device UEs may be scheduled according to scheduling flow 900.

At 905 in scheduling flow 900, the relay UE 135-*j* transmits a discovery signal to the end device UE 140-*k*. In some examples, the time at which the discovery signal is transmitted may be predetermined in order to allow for an energy efficient discovery procedure at both transmitting and receiving devices. The discovery signal may include device identification information, device wake schedule, chirp configuration, etc. The chirp configuration may include a preamble sequence, a cyclic shift value, relay UE 135-*j* ID, etc.

After receipt of the discovery signal, the end device UE 140-*k* may configure and/or generate a chirp signal at 910. The chirp signal may be configured and/or generated based on the chirp configuration contained within the discovery signal transmitted by the relay UE 135-*j*. The chirp signal may also contain end device UE 140-*k* and relay UE 135-*j* identification information, such as device ID, and a BSR indicating an amount of data to be transmitted, for example. Thereafter, the end device UE 140-*k* may transmit the chirp signal to the relay UE 135-*j* requesting transmission of data at 915.

Based on the received chirp signal, the relay UE 135-*j* may determine assignment information and/or other connection setup information, e.g., a C-RNTI at 920. The relay UE 135-*j* may transmit the assignment information and/or other connection setup information to the end device UE 140-*k* at 925. Based on the assignment information and/or other connection setup information, the end device UE 140-*k* may transmit a data packet to the relay UE 135-*j* at 930, which may respond by transmitting an ACK signal to the end device UE 140-*k* indicating successful reception of the data packet at 935. After successful reception, the relay UE 135-*j* may transmit the data packet received from the end device UE 140-*k* to the base station 105-*g* at 940. Although not shown, an ACK and/or a NACK signal may be sent from the base station 105-*f* to the relay UE 135-*i* to indicate successful or unsuccessful reception of the data packet. The ACK/NACK signals may be included with other transmissions (e.g., data packet transmission) or sent separately. In some examples of periodic transmission, once a relay UE 135-*i* and an end device UE 140-*j* are synchronized, the end device UE 140-*j* may transmit data packets to the relay UE 135-*i* periodically without having to perform a discovery procedure and/or request a grant to send data.

In some examples, in a multi-hop wireless communications system where multiple relay devices are utilized, one or more relay devices may perform a second stage discovery procedure. The second stage discovery procedure may be used to reduce contention between relay devices and other UEs in a multi-hop wireless communications system. In the second stage discovery procedure, a relay may transmit a signal to a base station that includes information related to occupied data slots, periodicity of one or more end devices, and/or a set of reserved slots for new end devices. Based on the transmission signal, the relay device may reserve or otherwise use one or more data slots. Thereafter, another relay device may perform second stage discovery and reserve or otherwise use one or more data slots sequentially following the data slots reserved by the previous relay device. Sequential reserving and/or using of one or more data slots may help prevent transmission collisions and interference in a multi-hop wireless communications system.

Figure 10:
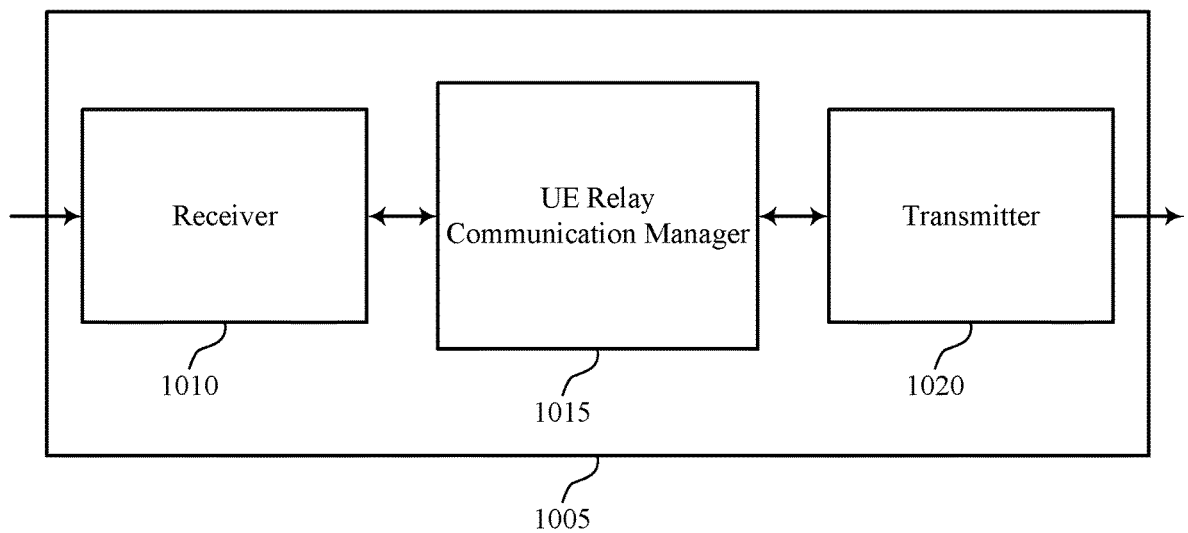
FIGS. 10 through 12 show block diagrams of a device that supports traffic scheduling in a multi-hop communications system in accordance with aspects of the present disclosure.

FIG. 10 shows a block diagram 1000 of a wireless device 1005 that supports traffic scheduling in a multi-hop communications system in accordance with various aspects of the present disclosure. Wireless device 1005 may be an example of aspects of a UE 115 as described with reference to FIG. 1. Wireless device 1005 may include receiver 1010, UE relay communication manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to traffic scheduling in a multi-hop communications system, etc.). Information may be passed on to other components of the device. The receiver 1010 may be an example of aspects of the transceiver 1335 described with reference to FIG. 13.

UE relay communication manager 1015 may be an example of aspects of the UE relay communication manager 1315 described with reference to FIG. 13.

UE relay communication manager 1015 may receive control information from a serving station, determine resource assignment information for an end device based on the control information received from the serving station, synchronize with the end device based on the control information received from the serving station, receive an ACK from the end device in response to the synchronizing, the ACK indicating the end device is synchronized with the relay device, receive a data packet from the end device subsequent to the synchronizing, the receiving based on the determined resource assignment information, and transmit, to the serving station, the data packet received from the end device, the transmitting based on the control information received from the serving station. The UE relay communication manager 1015 may also receive a primary synchronization signal (PSS) from a serving station, the PSS indicating hop path information associated with the end device, synchronize with a relay device based on the PSS received from the serving station, transmit an ACK to the relay device, the ACK indicating that the end device is synchronized with the relay device, receive resource assignment information from the serving station, and transmit, to the relay station, a data packet to be transmitted to the serving station, the transmitting based on resource assignment information received from the serving station. The UE relay communication manager 1015 may also synchronize with a relay device, transmit an ACK to the relay device, the ACK indicating that the end device is synchronized with the relay device, receive resource assignment information from the relay device, and transmit, to the relay station, a data packet to be transmitted to the serving station, the transmitting based on resource assignment information received from the relay.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
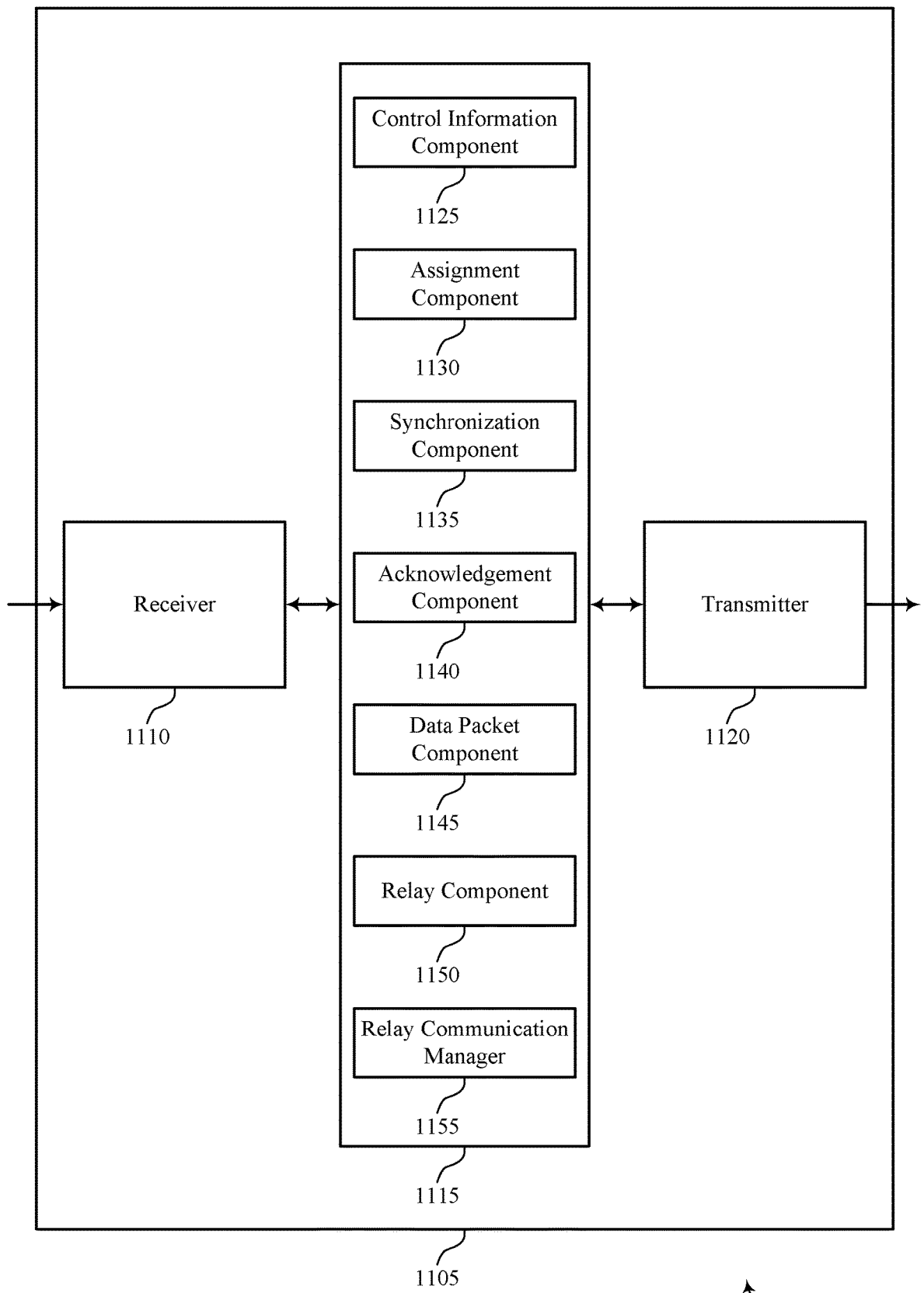

FIG. 11 shows a block diagram 1100 of a wireless device 1105 that supports traffic scheduling in a multi-hop communications system in accordance with various aspects of the present disclosure. Wireless device 1105 may be an example of aspects of a wireless device 1005 or a UE 115 as described with reference to FIGS. 1 and 10. Wireless device 1105 may include receiver 1110, UE relay communication manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to traffic scheduling in a multi-hop communications system, etc.). Information may be passed on to other components of the device. The receiver 1110 may be an example of aspects of the transceiver 1335 described with reference to FIG. 13.

UE relay communication manager 1115 may be an example of aspects of the UE relay communication manager 1315 described with reference to FIG. 13.

UE relay communication manager 1115 may also include control information component 1125, assignment component 1130, synchronization component 1135, acknowledgement component 1140, data packet component 1145, relay component 1150, and relay communication manager 1155.

Control information component 1125 may receive control information from a serving station. In some cases, receiving control information includes: receiving a Physical Downlink Control Channel (PDCCH) from the serving station. In some cases, receiving control information includes: receiving the resource assignment information for at least one of the relay device or the end device. In some cases, receiving control information includes: receiving data slot partition information of the serving station. In some cases, the data slot partition information of the serving station includes gap out information indicative of one or more slots available for communication between the end device and the relay device.

Assignment component 1130 may determine resource assignment information for an end device based on the control information received from the serving station, receive resource assignment information from the relay device, the assignment information based on the received chirp signal, transmit the resource assignment information to the end device, the resource assignment information including hop path information, determine the resource assignment information based on the received association signal, transmit resource assignment information to the end device, the resource assignment information based on the received chirp signal, transmit resource assignment information to the one of the multiple end devices, the resource assignment information based on the occupied data slots and the reserved unoccupied data slot, transmit the determined resource assignment information to the end device via a Physical Downlink Control Channel (PDCCH) of the relay device, receive resource assignment information from the relay device, receive the resource assignment information from the relay device, the resource assignment information including hop path information, and receive resource assignment information from the serving station. In some cases, determining resource assignment information further includes: determining the resource assignment information based on available resources of the relay device. In some cases, receiving assignment information includes: receiving resource assignment information via a Physical Downlink Control Channel (PDCCH) of the serving station. In some cases, the resource assignment information is determined based on available resources of the relay device. In some cases, the resource assignment information is determined based on the association signal.

Synchronization component 1135 may synchronize with the end device based on the control information received from the serving station, transmit a chirp signal based on the chirp configuration, the chirp signal including end device ID information and a BSR, receive a chirp signal based on the chirp configuration from the end device, the chirp signal including end device identification (ID) information and a buffer status report (BSR), reserv an unoccupied data slot for one of the multiple end devices, synchronize with a relay device, and synchronize with a relay device based on the PSS received from the serving station. In some cases, synchronizing further includes: broadcasting a discovery signal to the end device, the discovery signal including a chirp configuration. In some cases, synchronizing further includes: broadcasting a discovery signal to multiple end devices, the discovery signal including occupied data slots. In some cases, synchronizing further includes: transmitting a discovery signal to the end device. In some cases, synchronizing further includes: receiving resource assignment information via a Physical Downlink Control Channel (PDCCH) of the relay device. In some cases, synchronizing further includes: receiving a discovery signal from the relay device. In some cases, synchronizing further includes: receiving a discovery signal from the relay device, the discovery signal including a chirp configuration.

Acknowledgement component 1140 may receive an ACK from the end device in response to the synchronizing, the ACK indicating the end device is synchronized with the relay device and transmit an ACK to the relay device, the ACK indicating that the end device is synchronized with the relay device.

Data packet component 1145 may receive a data packet from the end device subsequent to the synchronizing, the receiving based on the determined resource assignment information, transmit, to the relay station, a data packet to be transmitted to the serving station, the transmitting based on resource assignment information received from the serving station, and transmit, to the relay station, a data packet to be transmitted to the serving station, the transmitting based on resource assignment information received from the relay.

Relay component 1150 may transmit, to the serving station, the data packet received from the end device, the transmitting based on the control information received from the serving station.

Relay communication manager 1155 may receive a primary synchronization signal (PSS) from a serving station, the PSS indicating hop path information associated with the end device.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
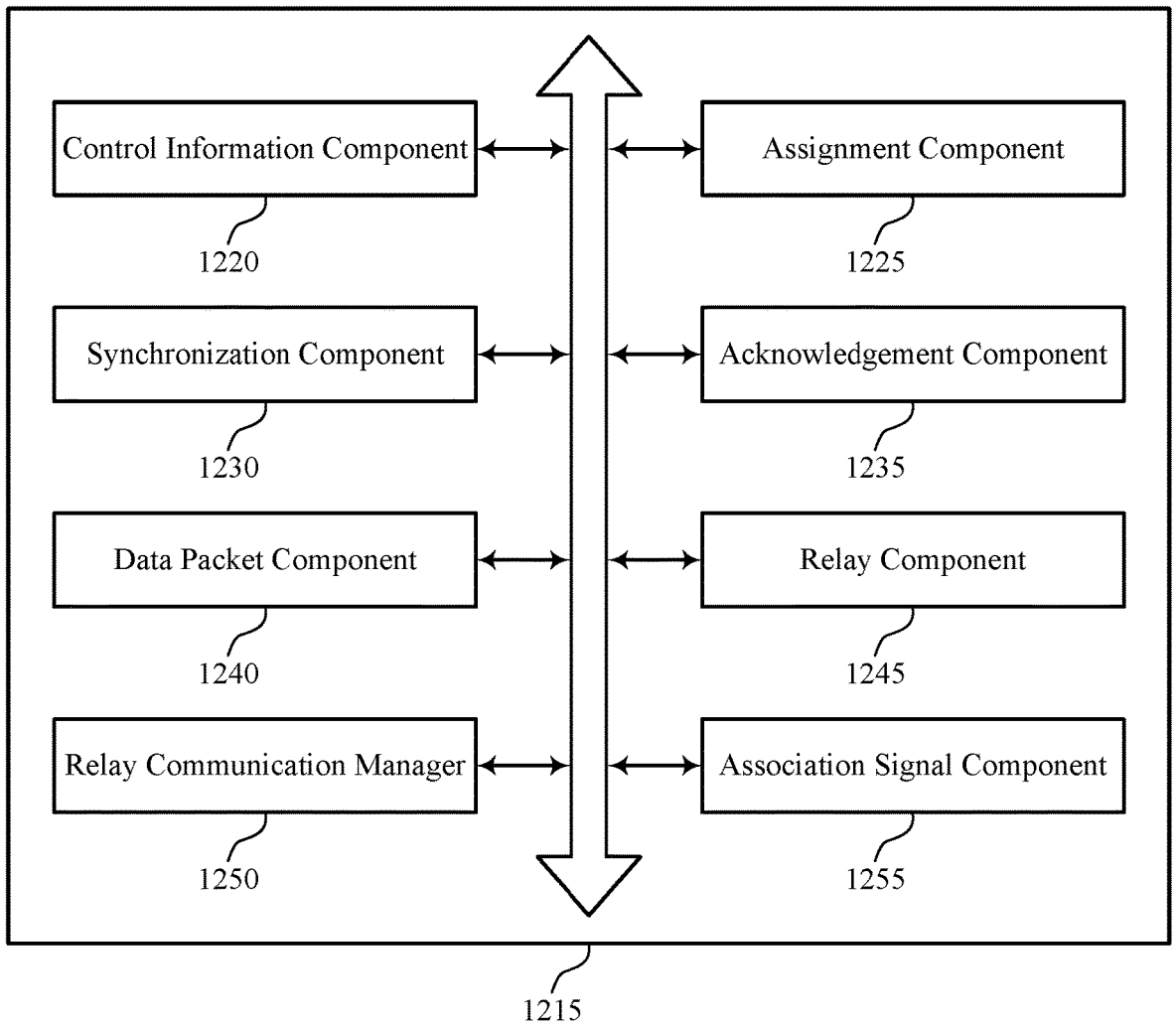

FIG. 12 shows a block diagram 1200 of a UE relay communication manager 1215 that supports traffic scheduling in a multi-hop communications system in accordance with various aspects of the present disclosure. The UE relay communication manager 1215 may be an example of aspects of a UE relay communication manager 1015, a UE relay communication manager 1115, or a UE relay communication manager 1315 described with reference to FIGS. 10, 11, and 13. The UE relay communication manager 1215 may include control information component 1220, assignment component 1225, synchronization component 1230, acknowledgement component 1235, data packet component 1240, relay component 1245, relay communication manager 1250, and association signal component 1255. Each of these modules may communicate, directly or indirectly, with one another (e.g., via one or more buses).

Control information component 1220 may receive control information from a serving station. In some cases, receiving control information includes: receiving a Physical Downlink Control Channel (PDCCH) from the serving station. In some cases, receiving control information includes: receiving the resource assignment information for at least one of the relay device or the end device. In some cases, receiving control information includes: receiving data slot partition information of the serving station. In some cases, the data slot partition information of the serving station includes gap out information indicative of one or more slots available for communication between the end device and the relay device.

Assignment component 1225 may determine resource assignment information for an end device based on the control information received from the serving station, receive resource assignment information from the relay device, the assignment information based on the received chirp signal, transmit the resource assignment information to the end device, the resource assignment information including hop path information, determine the resource assignment information based on the received association signal, transmit resource assignment information to the end device, the resource assignment information based on the received chirp signal, transmit resource assignment information to the one of the multiple end devices, the resource assignment information based on the occupied data slots and the reserved unoccupied data slot, transmit the determined resource assignment information to the end device via a Physical Downlink Control Channel (PDCCH) of the relay device, receive resource assignment information from the relay device, receive the resource assignment information from the relay device, the resource assignment information including hop path information, and receive resource assignment information from the serving station. In some cases, determining resource assignment information further includes: determining the resource assignment information based on available resources of the relay device. In some cases, receiving assignment information includes: receiving resource assignment information via a Physical Downlink Control Channel (PDCCH) of the serving station. In some cases, the resource assignment information is determined based on available resources of the relay device. In some cases, the resource assignment information is determined based on the association signal.

Synchronization component 1230 may synchronize with the end device based on the control information received from the serving station, transmit a chirp signal based on the chirp configuration, the chirp signal including end device ID information and a BSR, receive a chirp signal based on the chirp configuration from the end device, the chirp signal including end device identification (ID) information and a buffer status report (BSR), reserv an unoccupied data slot for one of the multiple end devices, synchronize with a relay device, and synchronize with a relay device based on the PSS received from the serving station. In some cases, synchronizing further includes: broadcasting a discovery signal to the end device, the discovery signal including a chirp configuration. In some cases, synchronizing further includes: broadcasting a discovery signal to multiple end devices, the discovery signal including occupied data slots. In some cases, synchronizing further includes: transmitting a discovery signal to the end device. In some cases, synchronizing further includes: receiving resource assignment information via a Physical Downlink Control Channel (PDCCH) of the relay device. In some cases, synchronizing further includes: receiving a discovery signal from the relay device. In some cases, synchronizing further includes: receiving a discovery signal from the relay device, the discovery signal including a chirp configuration.

Acknowledgement component 1235 may receive an ACK from the end device in response to the synchronizing, the ACK indicating the end device is synchronized with the relay device and transmit an ACK to the relay device, the ACK indicating that the end device is synchronized with the relay device.

Data packet component 1240 may receive a data packet from the end device subsequent to the synchronizing, the receiving based on the determined resource assignment information, transmit, to the relay station, a data packet to be transmitted to the serving station, the transmitting based on resource assignment information received from the serving station, and transmit, to the relay station, a data packet to be transmitted to the serving station, the transmitting based on resource assignment information received from the relay.

Relay component 1245 may transmit, to the serving station, the data packet received from the end device, the transmitting based on the control information received from the serving station.

Relay communication manager 1250 may receive a primary synchronization signal (PSS) from a serving station, the PSS indicating hop path information associated with the end device.

Association signal component 1255 may receive an association signal from the end device and transmit an association signal to the relay device.

Figure 13:
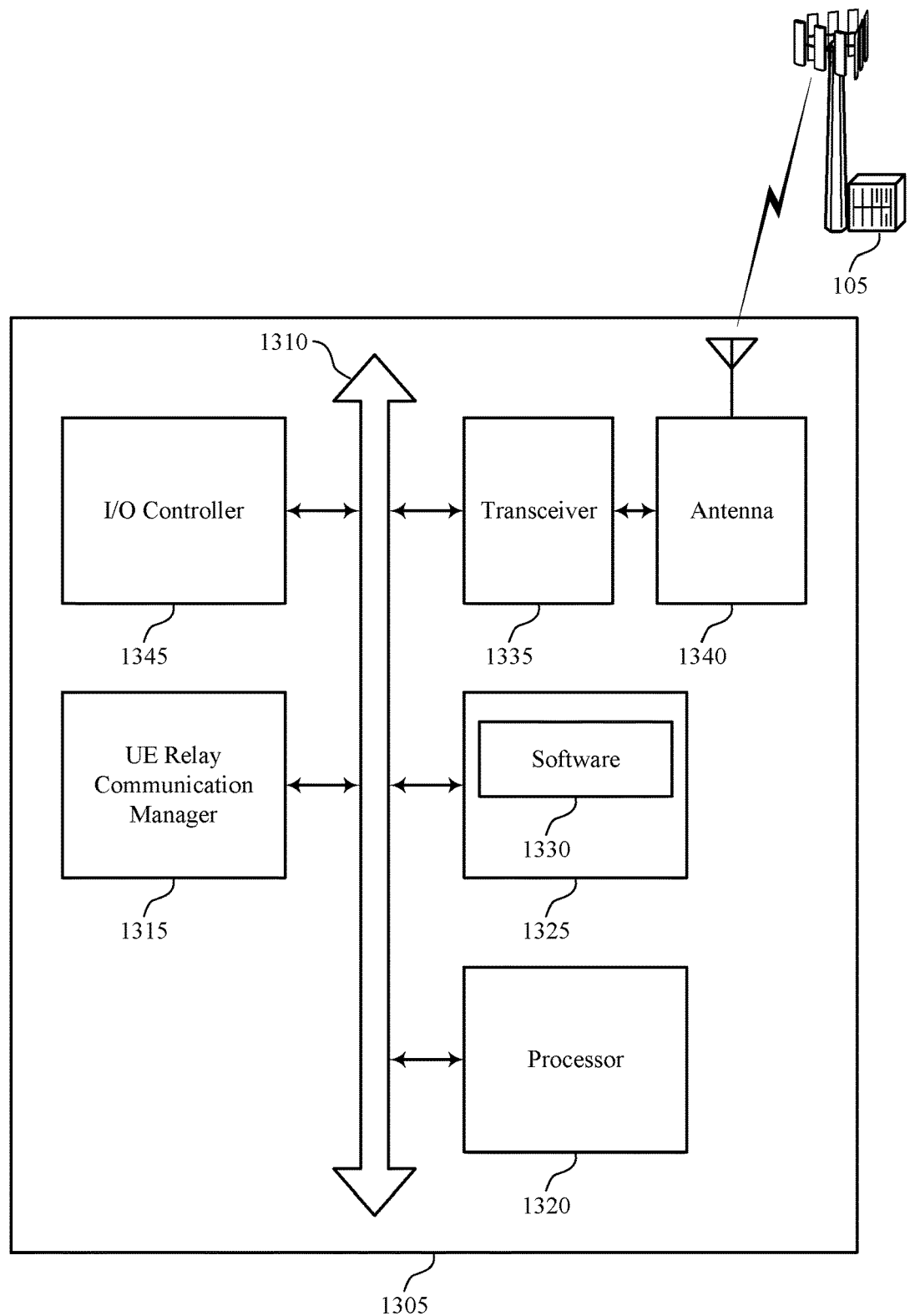
FIG. 13 illustrates a block diagram of a system including a UE that supports traffic scheduling in a multi-hop communications system in accordance with aspects of the present disclosure.

FIG. 13 shows a diagram of a system 1300 including a device 1305 that supports traffic scheduling in a multi-hop communications system in accordance with various aspects of the present disclosure. Device 1305 may be an example of or include the components of wireless device 1005, wireless device 1105, or a UE 115 as described above, e.g., with reference to FIGS. 1, 10 and 11.

Device 1305 may include components for bi-directional voice and data communications including components for transmitting and receiving communications, including UE relay communication manager 1315, processor 1320, memory 1325, software 1330, transceiver 1335, antenna 1340, and I/O controller 1345.

Processor 1320 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting traffic scheduling in a multi-hop communications system).1320.

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a Basic Input-Output system (BIOS) which may control basic hardware and/or software operation such as the interaction with peripheral components or devices.

Software 1330 may include code to implement aspects of the present disclosure, including code to support traffic scheduling in a multi-hop communications system. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. Input/output control component 1345 may also manage peripherals not integrated into device 1305. In some cases, input/output control component 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system.

Figure 14:
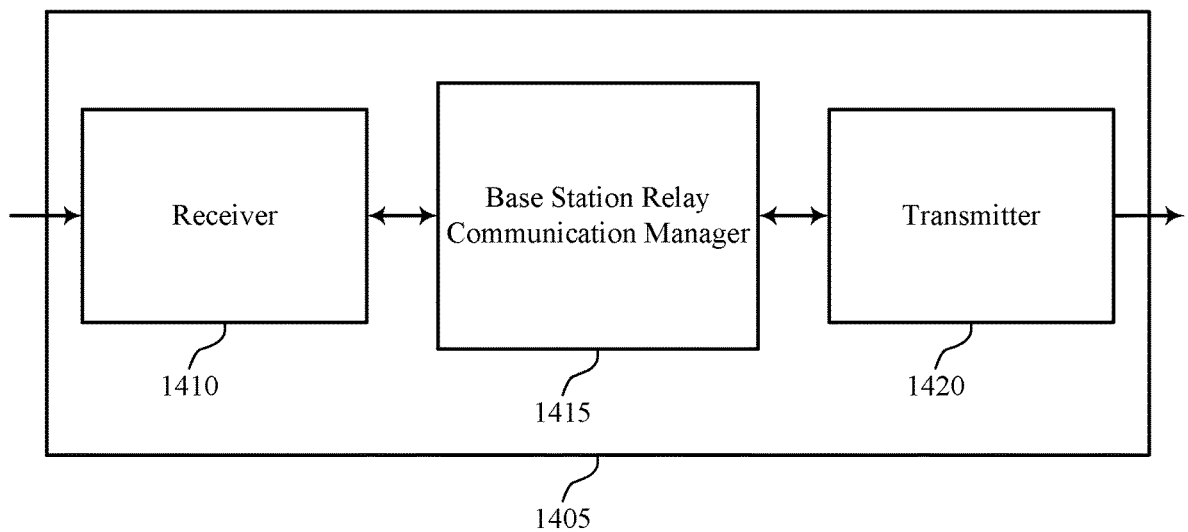
FIGS. 14 through 16 show block diagrams of a device that supports traffic scheduling in a multi-hop communications system in accordance with aspects of the present disclosure.

FIG. 14 shows a block diagram 1400 of a wireless device 1405 that supports traffic scheduling in a multi-hop communications system in accordance with various aspects of the present disclosure. Wireless device 1405 may be an example of aspects of a base station 105 as described with reference to FIG. 1. Wireless device 1405 may include receiver 1410, base station relay communication manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to traffic scheduling in a multi-hop communications system, etc.). Information may be passed on to other components of the device. The receiver 1410 may be an example of aspects of the transceiver 1735 described with reference to FIG. 17.

Base station relay communication manager 1415 may be an example of aspects of the base station relay communication manager 1715 described with reference to FIG. 17.

Base station relay communication manager 1415 may perform a synchronization procedure with a relay device, transmit, to the relay device, relay control information including resource assignment information for the relay device, and receive a data packet from the relay device, the data packet transmitted to the relay device from the end device after the end device has synchronized with the relay device, the data packet being received at the serving station in accordance with the resource assignment information for the relay device.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may include a single antenna, or it may include a set of antennas.

Figure 15:
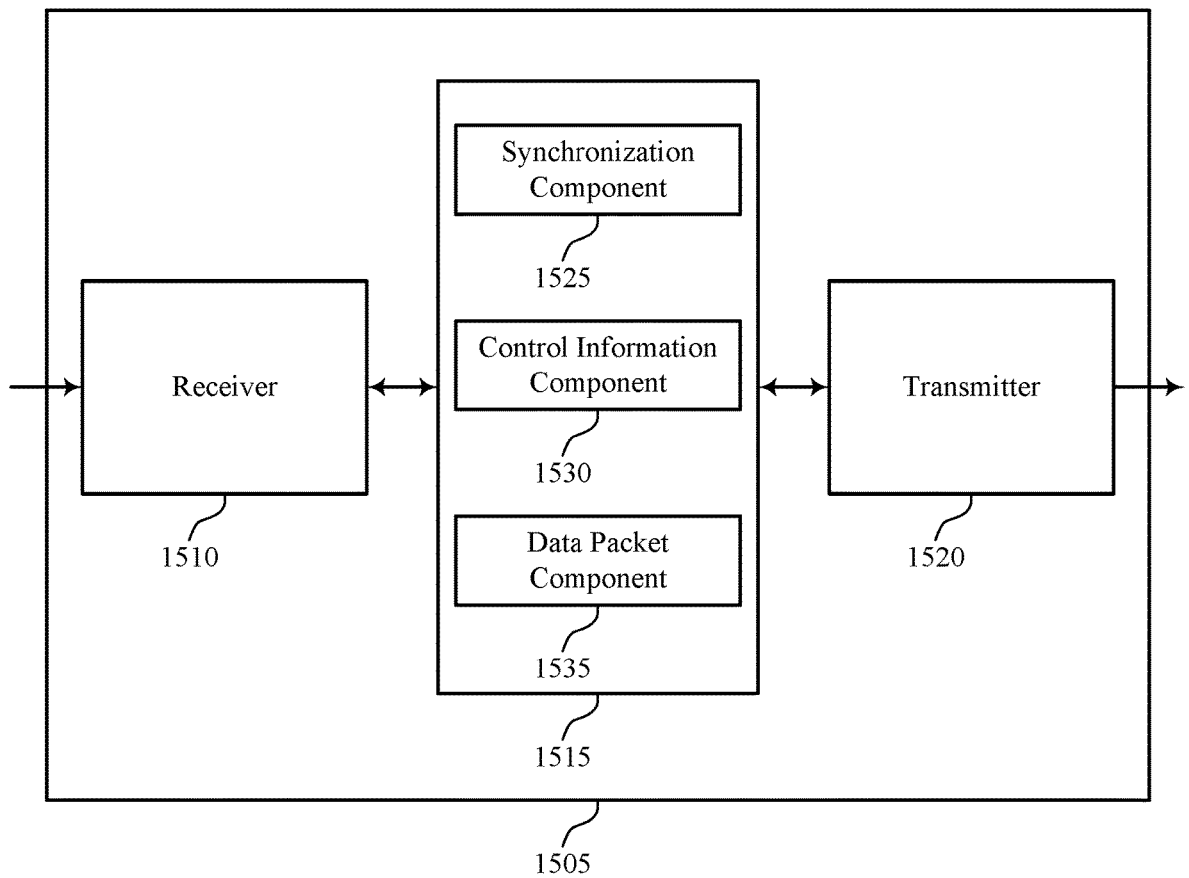

FIG. 15 shows a block diagram 1500 of a wireless device 1505 that supports traffic scheduling in a multi-hop communications system in accordance with various aspects of the present disclosure. Wireless device 1505 may be an example of aspects of a wireless device 1405 or a base station 105 as described with reference to FIGS. 1 and 14. Wireless device 1505 may include receiver 1510, base station relay communication manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to traffic scheduling in a multi-hop communications system, etc.). Information may be passed on to other components of the device. The receiver 1510 may be an example of aspects of the transceiver 1735 described with reference to FIG. 17.

Base station relay communication manager 1515 may be an example of aspects of the base station relay communication manager 1715 described with reference to FIG. 17.

Base station relay communication manager 1515 may also include synchronization component 1525, control information component 1530, and data packet component 1535.

Synchronization component 1525 may perform a synchronization procedure with a relay device.

Control information component 1530 may transmit, to the relay device, relay control information including resource assignment information for the relay device. In some cases, transmitting control information to the relay device includes: transmitting the control information via a Physical Downlink Control Channel (PDCCH) of the serving station. In some cases, transmitting control information to the relay device includes: transmitting resource assignment information for at least one of the relay device or the end device.

Data packet component 1535 may receive a data packet from the relay device, the data packet transmitted to the relay device from the end device after the end device has synchronized with the relay device, the data packet being received at the serving station in accordance with the resource assignment information for the relay device.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may include a single antenna, or it may include a set of antennas.

Figure 16:
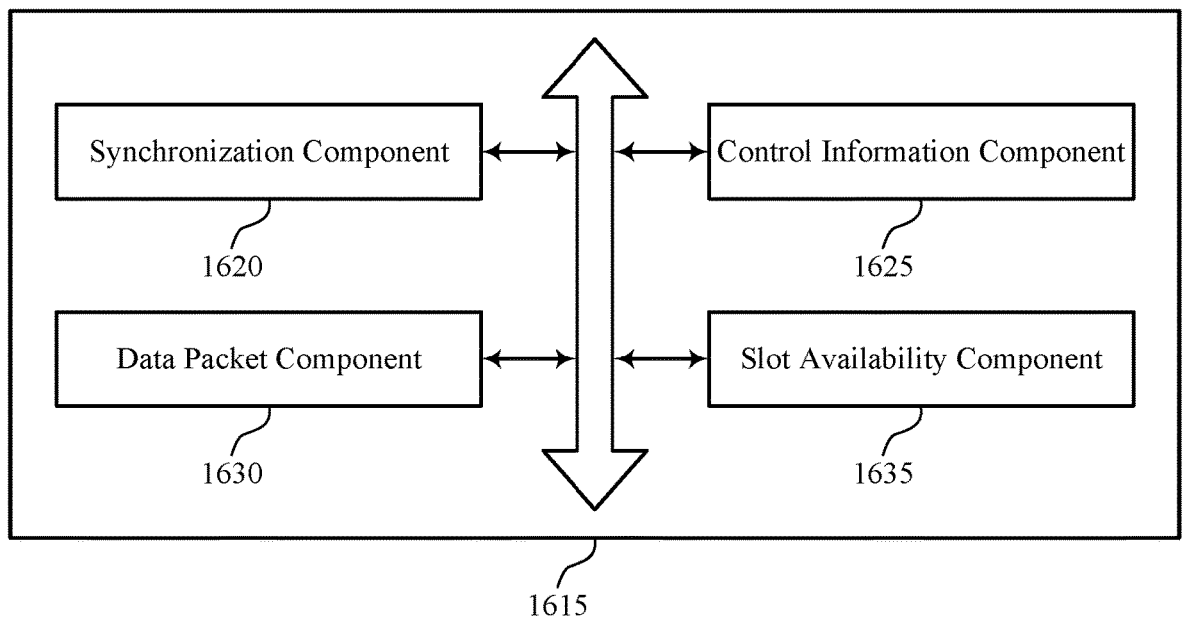

FIG. 16 shows a block diagram 1600 of a base station relay communication manager 1615 that supports traffic scheduling in a multi-hop communications system in accordance with various aspects of the present disclosure. The base station relay communication manager 1615 may be an example of aspects of a base station relay communication manager 1715 described with reference to FIGS. 14, 15, and 17. The base station relay communication manager 1615 may include synchronization component 1620, control information component 1625, data packet component 1630, and slot availability component 1635. Each of these modules may communicate, directly or indirectly, with one another (e.g., via one or more buses).

Synchronization component 1620 may perform a synchronization procedure with a relay device.

Control information component 1625 may transmit, to the relay device, relay control information including resource assignment information for the relay device. In some cases, transmitting control information to the relay device includes: transmitting the control information via a Physical Downlink Control Channel (PDCCH) of the serving station. In some cases, transmitting control information to the relay device includes: transmitting resource assignment information for at least one of the relay device or the end device.

Data packet component 1630 may receive a data packet from the relay device, the data packet transmitted to the relay device from the end device after the end device has synchronized with the relay device, the data packet being received at the serving station in accordance with the resource assignment information for the relay device.

Slot availability component 1635 may determine data slot partition or gap out information. In some cases, transmitting control information to the relay device includes: transmitting data slot partition information of the serving station or gap out information indicative of one or more slots available for communication between the end device and the relay device.

Figure 17:
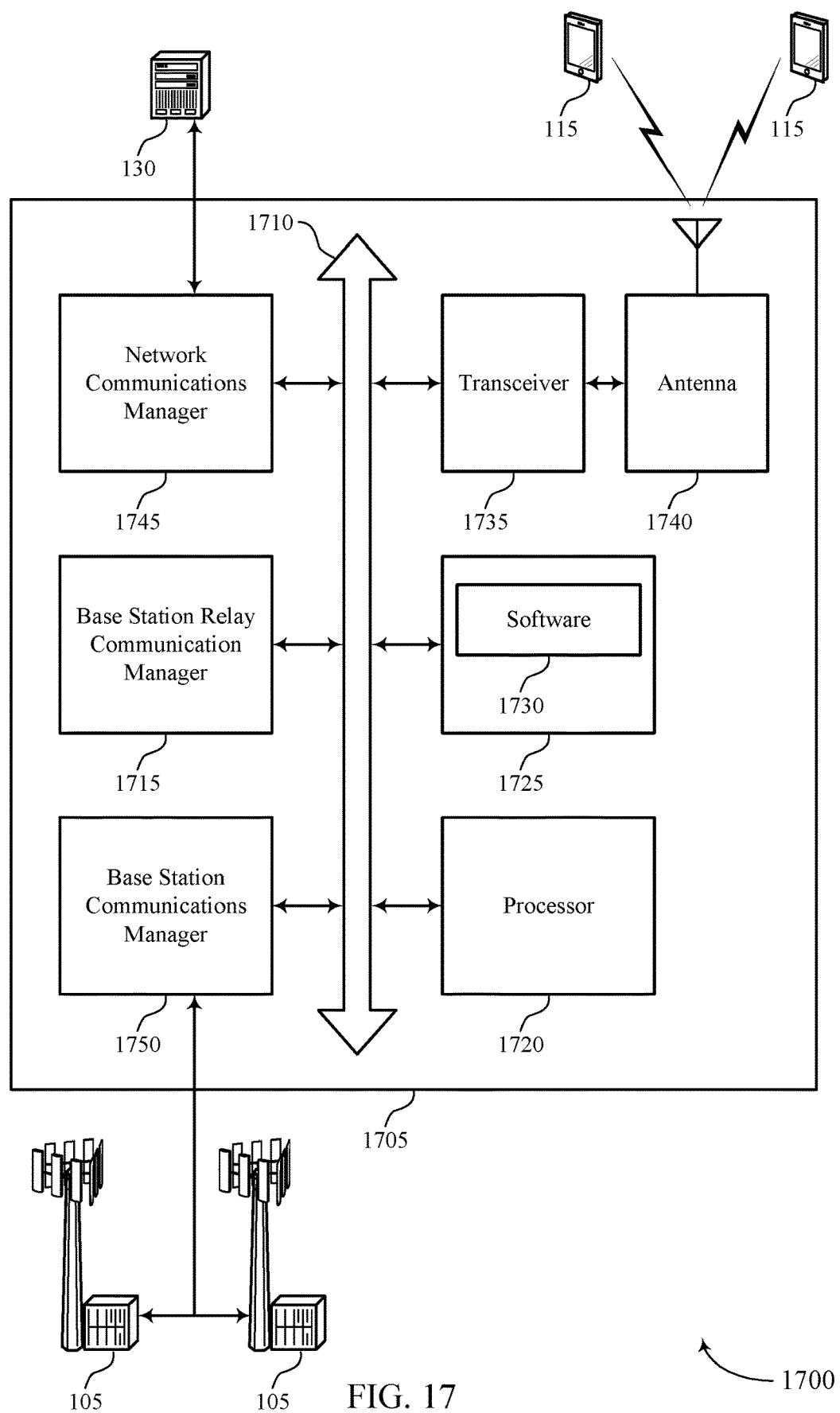
FIG. 17 illustrates a block diagram of a system including a base station that supports traffic scheduling in a multi-hop communications system in accordance with aspects of the present disclosure.

FIG. 17 shows a diagram of a system 1700 including a device 1705 that supports traffic scheduling in a multi-hop communications system in accordance with various aspects of the present disclosure. Device 1705 may be an example of or include the components of a base station 105 as described above, e.g., with reference to FIG. 1.

Device 1705 may include components for bi-directional voice and data communications including components for transmitting and receiving communications, including base station relay communication manager 1715, processor 1720, memory 1725, software 1730, transceiver 1735, antenna 1740, network communications manager 1745, and base station communications manager 1750.

Processor 1720 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting traffic scheduling in a multi-hop communications system).1720.

Memory 1725 may include random access memory (RAM) and read only memory (ROM). The memory 1725 may store computer-readable, computer-executable software 1730 including instructions that, when executed, cause the processor to perform various functions described herein. In some cases, the memory 1725 may contain, among other things, a Basic Input-Output system (BIOS) which may control basic hardware and/or software operation such as the interaction with peripheral components or devices.

Software 1730 may include code to implement aspects of the present disclosure, including code to support traffic scheduling in a multi-hop communications system. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas.

In some cases, the wireless device may include a single antenna 1740. However, in some cases the device may have more than one antenna 1740, which may be capable of concurrently transmitting or receiving multiple wireless transmissions.

Network communications manager 1745 may manage communications with the core network (e.g., via one or more wired backhaul links). For example, the network communications module 1745 may manage the transfer of data communications for client devices, such as one or more UEs 115.

Base station communications manager 1750 may manage communications with other base station 105, and may include a controller or scheduler for controlling communications with UEs 115 in cooperation with other base stations 105. For example, the base station communications manager 1750 may coordinate scheduling for transmissions to UEs 115 for various interference mitigation techniques such as beamforming or joint transmission. In some examples, base station communications manager 1750 may provide an X2 interface within an LTE/LTE-A wireless communication network technology to provide communication between base stations 105.

Figure 18:
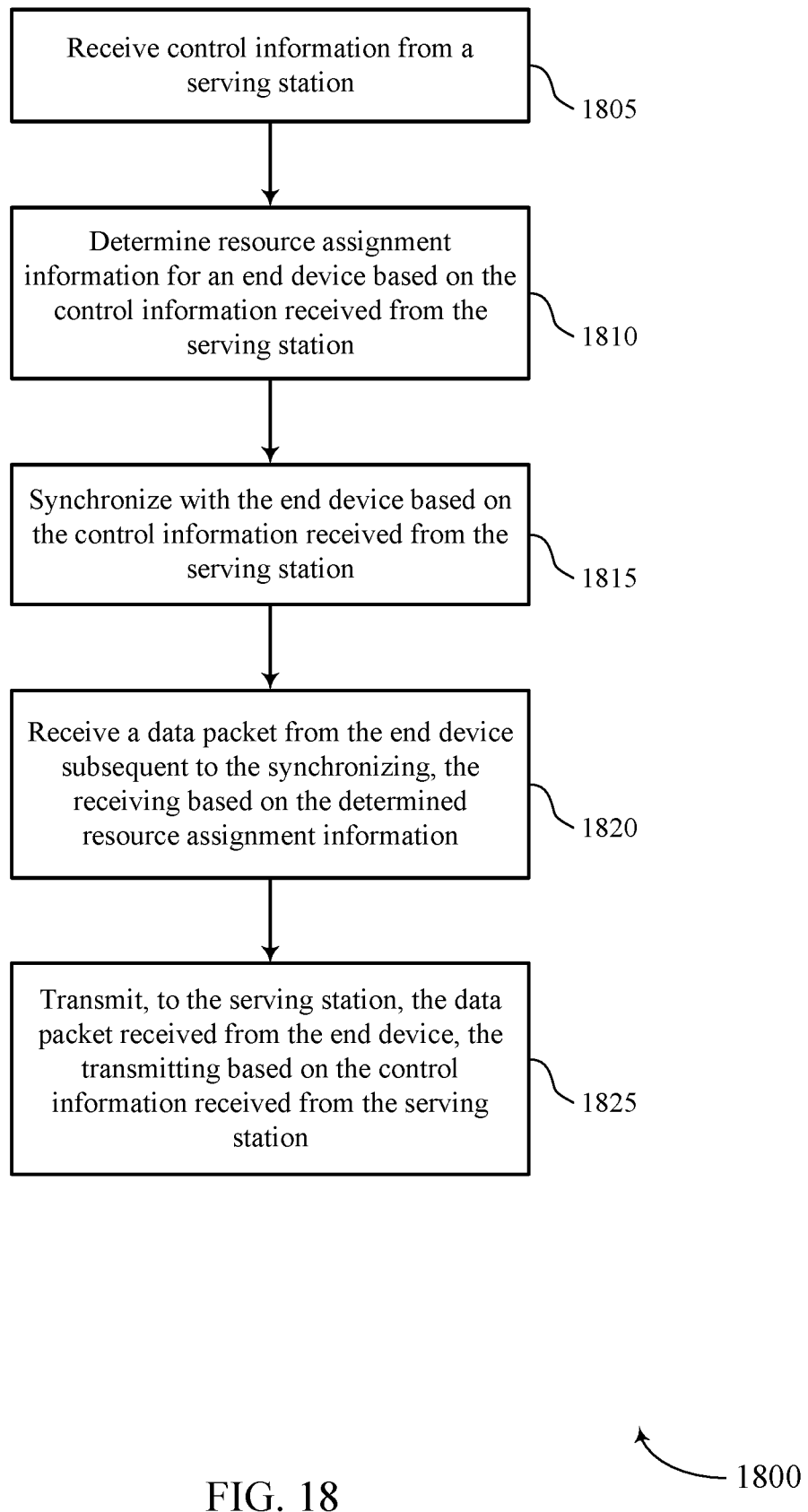
FIGS. 18 through 21 illustrate methods for traffic scheduling in a multi-hop communications system in accordance with aspects of the present disclosure.

FIG. 18 shows a flowchart illustrating a method 1800 for traffic scheduling in a multi-hop communications system in accordance with various aspects of the present disclosure. The operations of method 1800 may be implemented by a UE 115 or its components as described herein. For example, the operations of method 1800 may be performed by a UE relay communication manager as described with reference to FIGS. 10 through 13. In some examples, a UE 115 may execute a set of codes to control the functional elements of the device to perform the functions described below. Additionally or alternatively, the UE 115 may perform aspects the functions described below using special-purpose hardware.

At block 1805, the UE 115 may receive control information from a serving station. The operations of block 1805 may be performed according to the methods described with reference to FIGS. 1 through 9. In certain examples, aspects of the operations of block 1805 may be performed by a control information component as described with reference to FIGS. 10 through 13.

At block 1810, the UE 115 may determine resource assignment information for an end device based on the control information received from the serving station. The operations of block 1810 may be performed according to the methods described with reference to FIGS. 1 through 9. In certain examples, aspects of the operations of block 1810 may be performed by an assignment component as described with reference to FIGS. 10 through 13.

At block 1815, the UE 115 may synchronize with the end device based on the control information received from the serving station. The operations of block 1815 may be performed according to the methods described with reference to FIGS. 1 through 9. In certain examples, aspects of the operations of block 1815 may be performed by a synchronization component as described with reference to FIGS. 10 through 13.

At block 1820, the UE 115 may receive a data packet from the end device subsequent to the synchronizing, the receiving based on the determined resource assignment information. The operations of block 1820 may be performed according to the methods described with reference to FIGS. 1 through 9. In certain examples, aspects of the operations of block 1820 may be performed by a data packet component as described with reference to FIGS. 10 through 13.

At block 1825, the UE 115 may transmit, to the serving station, the data packet received from the end device, the transmitting based on the control information received from the serving station. The operations of block 1825 may be performed according to the methods described with reference to FIGS. 1 through 9. In certain examples, aspects of the operations of block 1825 may be performed by a relay component as described with reference to FIGS. 10 through 13.

Figure 19:
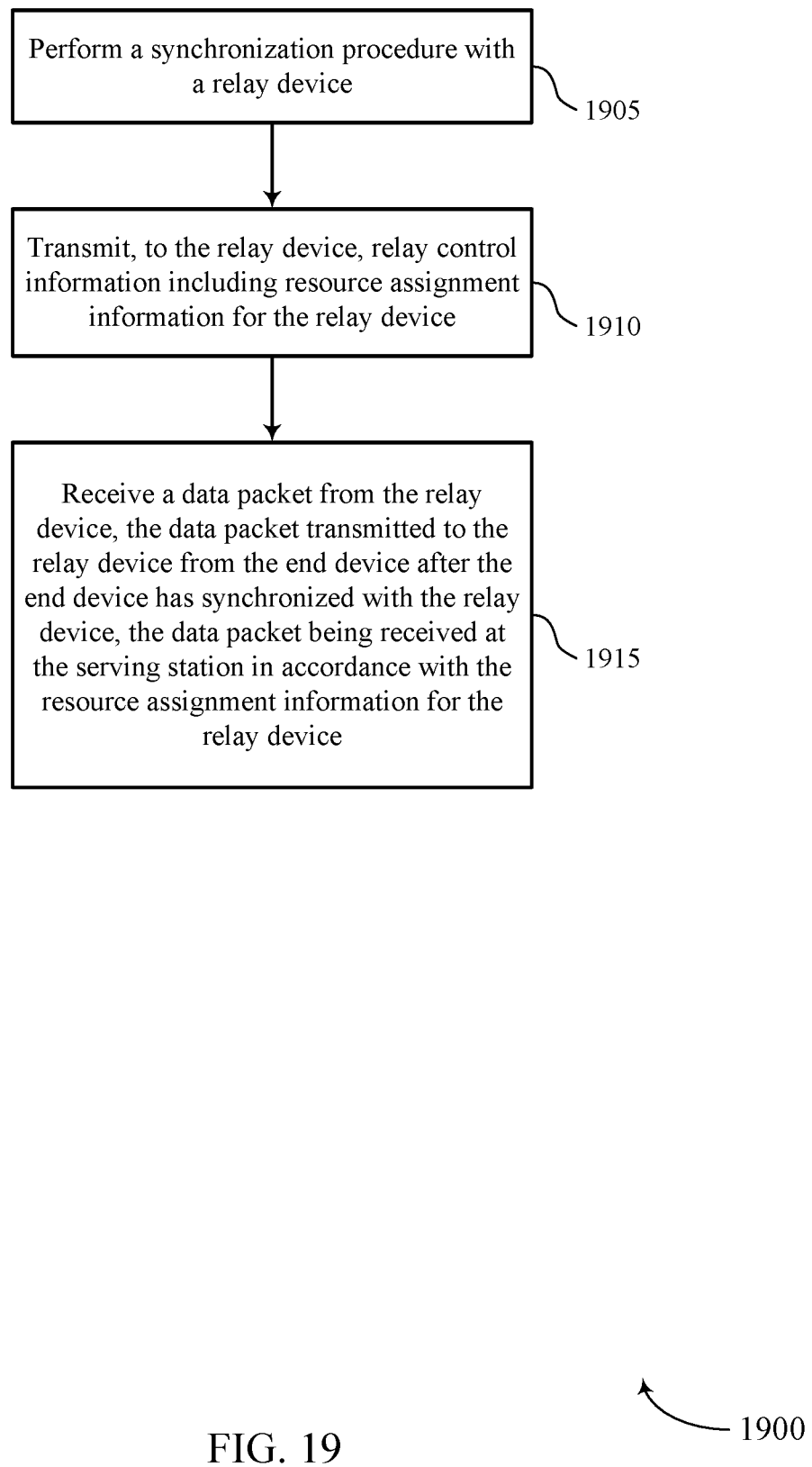

FIG. 19 shows a flowchart illustrating a method 1900 for traffic scheduling in a multi-hop communications system in accordance with various aspects of the present disclosure. The operations of method 1900 may be implemented by a base station 105 or its components as described herein. For example, the operations of method 1900 may be performed by a base station relay communication manager as described with reference to FIGS. 14 through 17. In some examples, a base station 105 may execute a set of codes to control the functional elements of the device to perform the functions described below. Additionally or alternatively, the base station 105 may perform aspects the functions described below using special-purpose hardware.

At block 1905, the base station 105 may perform a synchronization procedure with a relay device. The operations of block 1905 may be performed according to the methods described with reference to FIGS. 1 through 9. In certain examples, aspects of the operations of block 1905 may be performed by a synchronization component as described with reference to FIGS. 14 through 17.

At block 1910, the base station 105 may transmit, to the relay device, relay control information including resource assignment information for the relay device. The operations of block 1910 may be performed according to the methods described with reference to FIGS. 1 through 9. In certain examples, aspects of the operations of block 1910 may be performed by a control information component as described with reference to FIGS. 14 through 17.

At block 1915, the base station 105 may receive a data packet from the relay device, the data packet transmitted to the relay device from the end device after the end device has synchronized with the relay device, the data packet being received at the serving station in accordance with the resource assignment information for the relay device. The operations of block 1915 may be performed according to the methods described with reference to FIGS. 1 through 9. In certain examples, aspects of the operations of block 1915 may be performed by a data packet component as described with reference to FIGS. 14 through 17.

Figure 20:
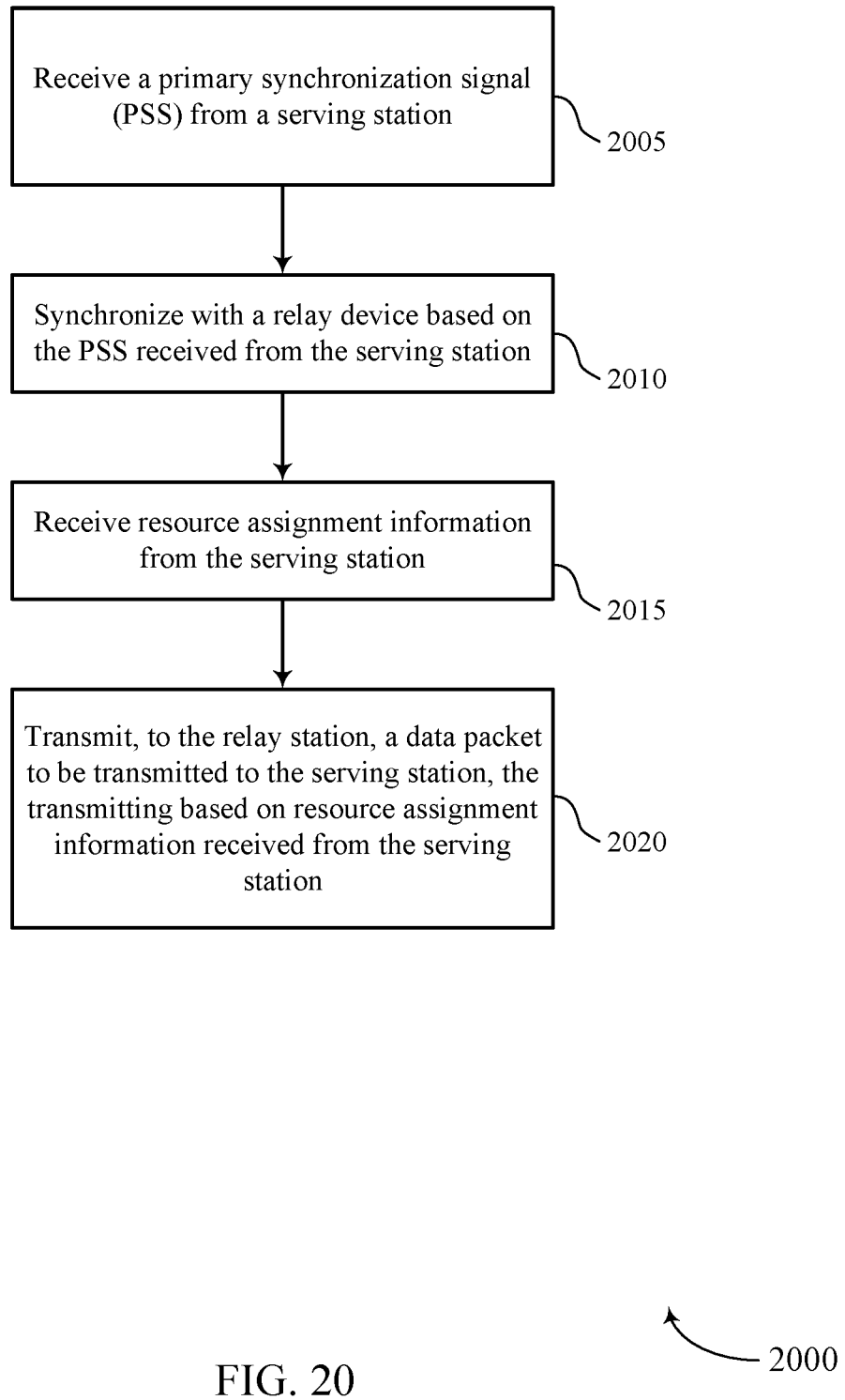

FIG. 20 shows a flowchart illustrating a method 2000 for traffic scheduling in a multi-hop communications system in accordance with various aspects of the present disclosure. The operations of method 2000 may be implemented by a UE 115 or its components as described herein. For example, the operations of method 2000 may be performed by a UE relay communication manager as described with reference to FIGS. 10 through 13. In some examples, a UE 115 may execute a set of codes to control the functional elements of the device to perform the functions described below. Additionally or alternatively, the UE 115 may perform aspects the functions described below using special-purpose hardware.

At block 2005, the UE 115 may receive a primary synchronization signal (PSS) from a serving station. The operations of block 2005 may be performed according to the methods described with reference to FIGS. 1 through 9. In certain examples, aspects of the operations of block 2005 may be performed by a relay communication manager as described with reference to FIGS. 10 through 13.

At block 2010, the UE 115 may synchronize with a relay device based on the PSS received from the serving station. The operations of block 2010 may be performed according to the methods described with reference to FIGS. 1 through 9. In certain examples, aspects of the operations of block 2010 may be performed by a synchronization component as described with reference to FIGS. 10 through 13.

At block 2015, the UE 115 may receive resource assignment information from the serving station. The operations of block 2015 may be performed according to the methods described with reference to FIGS. 1 through 9. In certain examples, aspects of the operations of block 2015 may be performed by an assignment component as described with reference to FIGS. 10 through 13.

At block 2020, the UE 115 may transmit, to the relay station, a data packet to be transmitted to the serving station, the transmitting based on resource assignment information received from the serving station. The operations of block 2020 may be performed according to the methods described with reference to FIGS. 1 through 9. In certain examples, aspects of the operations of block 2020 may be performed by a data packet component as described with reference to FIGS. 10 through 13.

Figure 21:
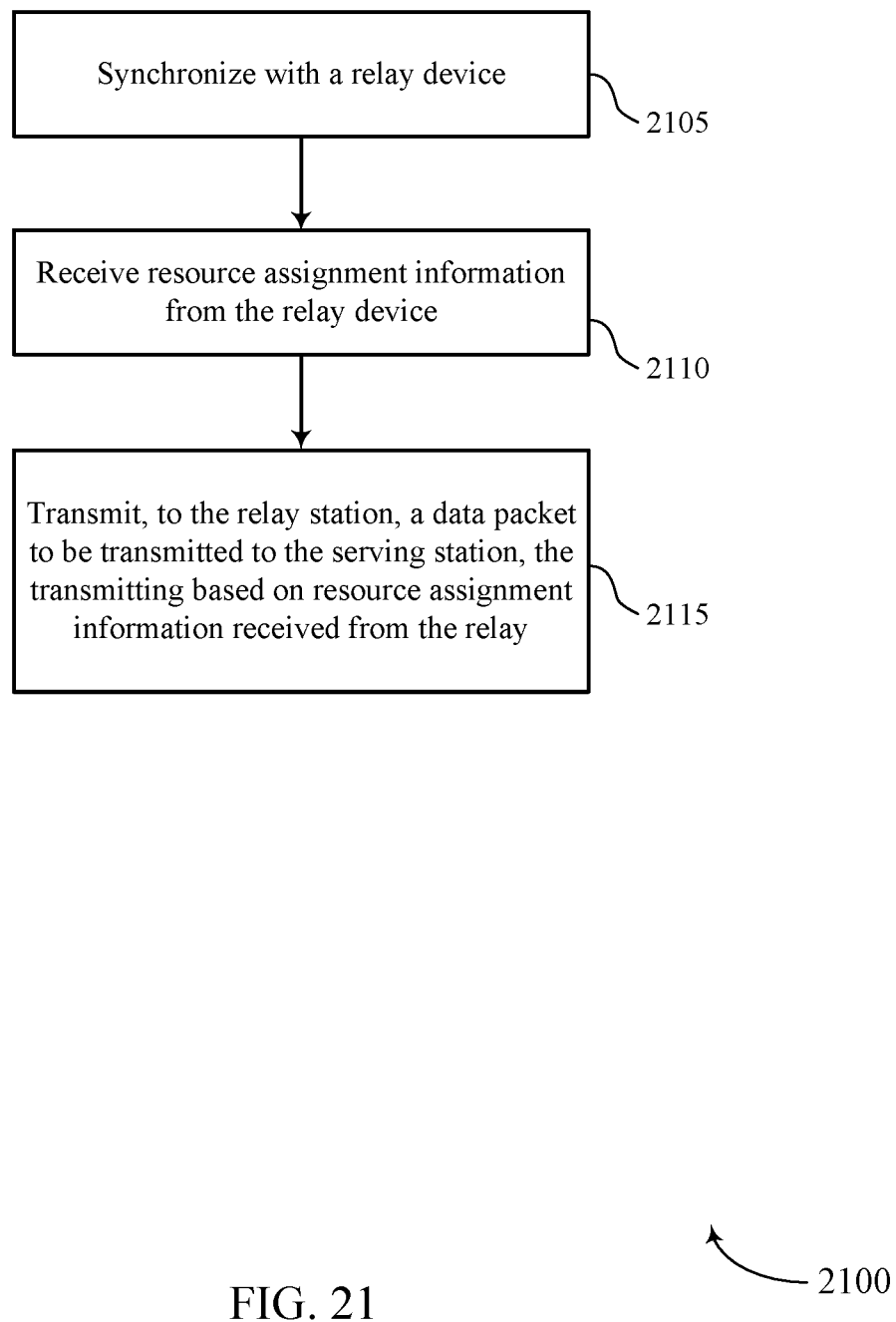

FIG. 21 shows a flowchart illustrating a method 2100 for traffic scheduling in a multi-hop communications system in accordance with various aspects of the present disclosure. The operations of method 2100 may be implemented by a UE 115 or its components as described herein. For example, the operations of method 2100 may be performed by a UE relay communication manager as described with reference to FIGS. 10 through 13. In some examples, a UE 115 may execute a set of codes to control the functional elements of the device to perform the functions described below. Additionally or alternatively, the UE 115 may perform aspects the functions described below using special-purpose hardware.

At block 2105, the UE 115 may synchronize with a relay device. The operations of block 2105 may be performed according to the methods described with reference to FIGS. 1 through 9. In certain examples, aspects of the operations of block 2105 may be performed by a synchronization component as described with reference to FIGS. 10 through 13.

At block 2110, the UE 115 may receive resource assignment information from the relay device. The operations of block 2110 may be performed according to the methods described with reference to FIGS. 1 through 9. In certain examples, aspects of the operations of block 2110 may be performed by an assignment component as described with reference to FIGS. 10 through 13.

At block 2115, the UE 115 may transmit, to the relay station, a data packet to be transmitted to the serving station, the transmitting based on resource assignment information received from the relay. The operations of block 2115 may be performed according to the methods described with reference to FIGS. 1 through 9. In certain examples, aspects of the operations of block 2115 may be performed by a data packet component as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication at a relay device, comprising:
 receiving, from a serving station, a serving station physical downlink control channel (PDCCH) that comprises control information comprising data slot partition information indicating data slots partitioned for communication between the serving station and the relay device and for communication between the relay device and an end device, wherein the data slot partition information comprises gap out information indicative of one or more of the data slots being available for communication between the end device and the relay device and during which the serving station refrains from transmission;
 determining, by the relay device, resource assignment information for the end device based at least in part on the data slot partition information and gap out information received from the serving station;
 synchronizing with the end device based at least in part on the control information received from the serving station;
 transmitting, by the relay device, a relay PDCCH that comprises the resource assignment information determined by the relay device, the resource assignment information including one or more of the data slots indicated by the gap out information;
 receiving a data packet from the end device subsequent to the synchronizing, the receiving based at least in part on the determined resource assignment information; and
 transmitting, to the serving station, the data packet received from the end device, the transmitting based at least in part on the control information received from the serving station.

2. The method of claim 1, wherein receiving the serving station PDCCH comprises:
 receiving the resource assignment information for at least one of the relay device or the end device.

3. The method of claim 1, wherein determining resource assignment information further comprises:
 determining the resource assignment information based at least in part on available resources of the relay device.

4. The method of claim 1, wherein synchronizing comprises:
 transmitting a discovery signal to the end device;
 receiving an association signal from the end device; and
 transmitting the resource assignment information to the end device, the resource assignment information comprising hop path information.

5. The method of claim 4, further comprising:
 determining the resource assignment information based at least in part on the received association signal.

6. The method of claim 1, wherein synchronizing comprises:
 broadcasting a discovery signal to the end device, the discovery signal comprising a chirp configuration;
 receiving a chirp signal based on the chirp configuration from the end device, the chirp signal comprising end device identification (ID) information and a buffer status report (BSR); and
 transmitting the resource assignment information to the end device, the resource assignment information based at least in part on the received chirp signal.

7. The method of claim 1, wherein synchronizing comprises:
 broadcasting a discovery signal to multiple end devices, the discovery signal comprising occupied data slots;
 reserving an unoccupied data slot for one of the multiple end devices; and
 transmitting the resource assignment information to the one of the multiple end devices, the resource assignment information based at least in part on the occupied data slots and the reserved unoccupied data slot.

8. An apparatus for wireless communication at a relay device, comprising:
 means for receiving, from a serving station, a serving station physical downlink control channel (PDCCH) that comprises control information comprising data slot partition information indicating data slots partitioned for communication between the serving station and the relay device and for communication between the relay device and an end device, wherein the data slot partition information comprises gap out information indicative of one or more of the data slots being available for communication between the end device and the relay device and during which the serving station refrains from transmission;
 means for determining, by the relay device, resource assignment information for the end device based at least in part on the data slot partition information and gap out information received from the serving station;
 means for synchronizing with the end device based at least in part on the control information received from the serving station;
 means for transmitting, by the relay device, a relay PDCCH that comprises the resource assignment information determined by the relay device, the resource assignment information including one or more of the data slots indicated by the gap out information;
 means for receiving a data packet from the end device subsequent to the synchronizing, the receiving based at least in part on the determined resource assignment information; and
 means for transmitting, to the serving station, the data packet received from the end device, the transmitting based at least in part on the control information received from the serving station.

9. The apparatus of claim 8, wherein the means for receiving the serving station PDCCH comprises:
 means for receiving the resource assignment information for at least one of the relay device or the end device.

10. The apparatus of claim 8, wherein the means for determining the resource assignment information further comprises:
 means for determining the resource assignment information based at least in part on available resources of the relay device.

11. The apparatus of claim 8, wherein the means for synchronizing comprises:
 means for transmitting a discovery signal to the end device;
 means for receiving an association signal from the end device; and
 means for transmitting the resource assignment information to the end device, the resource assignment information comprising hop path information.

12. The apparatus of claim 11, further comprising:
means for determining the resource assignment information based at least in part on the received association signal.

13. The apparatus of claim 8, wherein the means for synchronizing comprises:
means for broadcasting a discovery signal to the end device, the discovery signal comprising a chirp configuration;
means for receiving a chirp signal based on the chirp configuration from the end device, the chirp signal comprising end device identification (ID) information and a buffer status report (BSR); and
means for transmitting the resource assignment information to the end device, the resource assignment information based at least in part on the received chirp signal.

14. The apparatus of claim 8, wherein the means for synchronizing comprises:
means for broadcasting a discovery signal to multiple end devices, the discovery signal comprising occupied data slots;
means for reserving an unoccupied data slot for one of the multiple end devices; and
means for transmitting the resource assignment information to the one of the multiple end devices, the resource assignment information based at least in part on the occupied data slots and the reserved unoccupied data slot.

15. An apparatus for wireless communication at a relay device, comprising:
a processor;
memory in electronic communication with the processor; and
instructions stored in the memory and operable, when executed by the processor, to cause the apparatus to:
receive, from a serving station, a serving station physical downlink control channel (PDCCH) that comprises control information comprising data slot partition information indicating data slots partitioned for communication between the serving station and the relay device and for communication between the relay device and an end device, wherein the data slot partition information comprises gap out information indicative of one or more of the data slots being available for communication between the end device and the relay device and during which the serving station refrains from transmission;
determine, by the relay device, resource assignment information for the end device based at least in part on the data slot partition information and gap out information received from the serving station;
synchronize with the end device based at least in part on the control information received from the serving station;
transmit, by the relay device, a relay PDCCH that comprises the resource assignment information determined by the relay device, the resource assignment information including one or more of the data slots indicated by the gap out information;
receive a data packet from the end device subsequent to the synchronizing, the receiving based at least in part on the determined resource assignment information; and
transmit, to the serving station, the data packet received from the end device, the transmitting based at least in part on the control information received from the serving station.

16. A non-transitory computer-readable medium storing code for wireless communication at a relay device, the code comprising instructions executable to:
receive, from a serving station, a serving station physical downlink control channel (PDCCH) that comprises control information comprising data slot partition information indicating data slots partitioned for communication between the serving station and the relay device and for communication between the relay device and an end device, wherein the data slot partition information comprises gap out information indicative of one or more of the data slots being available for communication between the end device and the relay device and during which the serving station refrains from transmission;
determine, by the relay device, resource assignment information for the end device based at least in part on the data slot partition information and gap out information received from the serving station;
synchronize with the end device based at least in part on the control information received from the serving station;
transmit, by the relay device, a relay PDCCH that comprises the resource assignment information determined by the relay device, the resource assignment information including one or more of the data slots indicated by the gap out information;
receive a data packet from the end device subsequent to the synchronizing, the receiving based at least in part on the determined resource assignment information; and
transmit, to the serving station, the data packet received from the end device, the transmitting based at least in part on the control information received from the serving station.

* * * * *